(12) United States Patent
Qi et al.

(10) Patent No.: US 12,449,686 B2
(45) Date of Patent: Oct. 21, 2025

(54) BACKLIGHT MODULE, DISPLAY APPARATUS, ANTI-PEEP DISPLAY APPARATUS AND DRIVING METHOD THEREFOR

(71) Applicants: BEIJING BOE DISPLAY TECHNOLOGY CO., LTD., Beijing (CN); BOE TECHNOLOGY GROUP CO., LTD., Beijing (CN)

(72) Inventors: Yongle Qi, Beijing (CN); Rui Han, Beijing (CN); Dong Cui, Beijing (CN); Jie Yu, Beijing (CN); Daekeun Yoon, Beijing (CN); Qing Ma, Beijing (CN); Zhipeng Zhang, Beijing (CN); Weining Chi, Beijing (CN); Shouyang Leng, Beijing (CN); Wenyang Li, Beijing (CN); Yue Zhai, Beijing (CN); Fengping Wang, Beijing (CN); Yue Yang, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/681,615

(22) PCT Filed: Jan. 19, 2023

(86) PCT No.: PCT/CN2023/073136
§ 371 (c)(1),
(2) Date: Feb. 6, 2024

(87) PCT Pub. No.: WO2024/152298
PCT Pub. Date: Jul. 25, 2024

(65) Prior Publication Data
US 2025/0138351 A1 May 1, 2025

(51) Int. Cl.
*G02F 1/13* (2006.01)
*F21V 8/00* (2006.01)
(Continued)

(52) U.S. Cl.
CPC ......... *G02F 1/1323* (2013.01); *G02B 6/0036* (2013.01); *G02B 6/0055* (2013.01);
(Continued)

(58) Field of Classification Search
CPC ............. G02F 1/1323; G02F 1/133524; G02F 1/133605; G02F 1/133607
(Continued)

(56) References Cited

U.S. PATENT DOCUMENTS

2012/0235891 A1* 9/2012 Nishitani .............. G02F 1/1323
345/102
2018/0267344 A1 9/2018 Wu
(Continued)

FOREIGN PATENT DOCUMENTS

CN 102640039 A 8/2012
CN 108267811 A 7/2018
(Continued)

*Primary Examiner* — Keith G. Delahoussaye
(74) *Attorney, Agent, or Firm* — The Webb Law Firm

(57) ABSTRACT

A backlight module includes a light guide plate having a bottom surface, a light exit surface, and a light incident surface a substrate located on a side of the bottom surface away from the light exit surface; first light-emitting devices located on a side of the substrate proximate to the bottom surface second light-emitting devices disposed opposite to the light incident surface; and a prism sheet located on a side of the light guide plate away from the substrate. The first light-emitting devices are configured to emit first light, so that the first light passes through the light guide plate and the prism sheet to become light of a first viewing angle. The prism sheet is configured to cooperate with the light guide
(Continued)

plate to modulate second light emitted by the second light-emitting devices into light of a second viewing angle which is smaller than the first viewing angle.

18 Claims, 23 Drawing Sheets

(51) Int. Cl.
  *G02F 1/1335* (2006.01)
  *G02F 1/13357* (2006.01)
(52) U.S. Cl.
  CPC .. *G02F 1/133524* (2013.01); *G02F 1/133604* (2013.01); *G02F 1/133605* (2013.01); *G02F 1/133607* (2021.01); *G02F 1/133612* (2021.01)
(58) Field of Classification Search
  USPC ........................................... 362/97.1
  See application file for complete search history.

(56) References Cited

U.S. PATENT DOCUMENTS

| | | | |
|---|---|---|---|
| 2020/0241284 A1* | 7/2020 | Wu | G09G 3/32 |
| 2021/0390914 A1* | 12/2021 | Fattal | G02F 1/133602 |
| 2023/0107706 A1* | 4/2023 | Liu | G02F 1/1323 |
| | | | 362/97.1 |
| 2023/0288753 A1* | 9/2023 | Shiau | G02F 1/133615 |
| 2023/0408854 A1* | 12/2023 | Wu | G02F 1/1313 |
| 2024/0264486 A1* | 8/2024 | Chen | G02F 1/133603 |

FOREIGN PATENT DOCUMENTS

| | | |
|---|---|---|
| CN | 111474747 A | 7/2020 |
| CN | 112731713 A | 4/2021 |
| CN | 112835216 A | 5/2021 |
| CN | 215219372 U | 12/2021 |
| CN | 114624906 A | 6/2022 |
| CN | 115327820 A | 11/2022 |
| CN | 217875539 U | 11/2022 |
| CN | 217932157 U | 11/2022 |
| WO | 2012144451 A1 | 10/2012 |

* cited by examiner

BACKLIGHT MODULE, DISPLAY APPARATUS, ANTI-PEEP DISPLAY APPARATUS AND DRIVING METHOD THEREFOR

CROSS-REFERENCE TO RELATED APPLICATION

This application the United States national phase entry of International Patent Application No. PCT/CN2023/073136, filed Jan. 19, 2023, the disclosure of which is hereby incorporated by reference in its entirety.

BACKGROUND OF THE INVENTION

Field of the Invention

The present disclosure relates to the field of display technologies, and in particular, to a backlight module, a display apparatus, an anti-peep display apparatus and a driving method therefor.

Description of Related Art

Liquid crystal display (LCD) devices are more and more widely used due to their low power consumption, miniaturization, lightness and thinness, and other advantages. For example, the LCD devices have been used in various fields such as mobile phones, flat panel displays, vehicles, televisions, and public displays.

SUMMARY OF THE INVENTION

In an aspect, a backlight module is provided. The backlight module includes a light guide plate, a substrate, a plurality of first light-emitting devices, a plurality of second light-emitting devices, and a prism sheet. The light guide plate has a bottom surface and a light exit surface that are disposed oppositely, and a light incident surface connecting the bottom surface and the light exit surface. The substrate is located on a side of the bottom surface away from the light exit surface. The plurality of first light-emitting devices are located on a side of the substrate proximate to the bottom surface, and the substrate is configured to control operating states of the plurality of first light-emitting devices. The plurality of second light-emitting devices are disposed opposite to the light incident surface. The prism sheet is located on a side of the light guide plate away from the substrate. The plurality of first light-emitting devices are configured to emit first light, so that the first light passes through the light guide plate and the prism sheet to become light of a first viewing angle. The prism sheet is configured to cooperate with the light guide plate to modulate second light emitted by the plurality of second light-emitting devices into light of a second viewing angle, and the first viewing angle is larger than the second viewing angle.

In some embodiments, the substrate includes a plurality of chips, and a chip is electrically connected to at least one first light-emitting device.

In some embodiments, the substrate further includes a plurality of first pad groups and a plurality of second pad groups. The first pad groups are each electrically connected to a first light-emitting device, and the second pad groups are each electrically connected to the chip. Each first pad group includes at least two adjacent pads, and each second pad group includes at least four adjacent pads. A pad of the second pad group is electrically connected to a pad of at least one first pad group.

In some embodiments, the substrate further includes a plurality of first voltage lines and a plurality of first connection lines. A first voltage line is electrically connected to a pad of at least one first pad groups. A first connection line is electrically connected to the pad of the second pad group and a pad of a first pad group.

In some embodiments, in a case where the chip is electrically connected to multiple first light-emitting devices, the substrate further includes a plurality of second connection lines. A second connection line is electrically connected to pads of two adjacent first pad groups.

In some embodiments, the substrate further includes a plurality of address signal lines, a plurality of power supply voltage signal lines and a plurality of common voltage signal lines. Multiple pads of the second pad group are electrically connected to a common voltage signal line, a power supply voltage signal line and an address signal line, respectively.

In some embodiments, the substrate includes a plurality of driving circuits. A driving circuit is electrically connected to at least one first light-emitting device.

In some embodiments, the substrate further includes a plurality of scan signal lines, a plurality of data signal lines and a plurality of second voltage lines. The driving circuit includes a first transistor, a second transistor and a storage capacitor. A control electrode of the first transistor is electrically connected to a scan signal line, a first electrode of the first transistor is electrically connected to a data signal line, and a second electrode of the first transistor is electrically connected to a first electrode of the storage capacitor. A control electrode of the second transistor is electrically connected to the first electrode of the storage capacitor, a first electrode of the second transistor is electrically connected to a first electrode of a first light-emitting device, and a second electrode of the second transistor is grounded. A second electrode of the first light-emitting device is electrically connected to a second voltage line. A second electrode of the storage capacitor is grounded.

In some embodiments, a first light-emitting device has a top surface and a first side surface, and the first side surface surrounds the top surface and is connected to the top surface. A light intensity of light emitted from the top surface of the first light-emitting device is smaller than a light intensity of light emitted from the first side surface of the first light-emitting device.

In some embodiments, the first light-emitting device includes a first lamp bead and a transflective film. The transflective film covers a top surface of the first lamp bead.

In some embodiments, the first light-emitting device includes a second lamp bead and a lens. The lens covers a top surface of the second lamp bead. A surface of the lens away from the substrate is a smooth curved surface, and the smooth curved surface includes a first portion and a second portion surrounding the first portion. The first portion is concave toward a direction approaching the substrate, and the second portion is convex toward a direction away from the substrate.

In some embodiments, the light guide plate further has a second side surface. The second side surface connects the bottom surface and the light exit surface, and is opposite to the light incident surface. An included angle between the bottom surface and the second side surface is an obtuse angle, and an included angle between the bottom surface and the light exit surface is a first acute angle.

In some embodiments, the first acute angle is in a range of 0.1° to 10°, inclusive.

In some embodiments, the light guide plate includes a light guide body and a plurality of microstructures, and the plurality of microstructures are located on a side of the light guide body proximate to the substrate. The plurality of microstructures are configured to increase exit angle of the second light, so that the exit angle of the second light reaches a preset exit angle range.

In some embodiments, the microstructures each have a reflective surface, and the reflective surface is configured to reflect the second light incident on the reflective surface.

In some embodiments, the microstructures each further have a third side surface connected to the reflective surface. An included angle between the third side surface and the light exit surface is a second acute angle, an included angle between the reflective surface and the light exit surface is a third acute angle, and the second acute angle is greater than the third acute angle. An included angle between the third side surface and the reflective surface is an obtuse angle, and the reflective surface is closer to the second light-emitting devices than the third side surface.

In some embodiments, the third acute angle is in a range of 0.1° to 10°, inclusive.

In some embodiments, the plurality of microstructures are arranged in an array. A sum of areas of reflective surfaces of multiple microstructures in a column is positively correlated with a distance between the multiple microstructures in the column and the plurality of second light-emitting devices.

In some embodiments, an area of a reflective surface of a microstructure is positively correlated with a distance between the microstructure and the plurality of second light-emitting devices.

In some embodiments, an arrangement density of multiple microstructures in the plurality of microstructures is positively correlated with a distance between the multiple microstructures and the plurality of second light-emitting devices.

In some embodiments, the reflective surface and the third side surface of each of the plurality of microstructures are convex toward a direction away from the light exit surface.

In some embodiments, the reflective surface and the third side surface of each of the plurality of microstructures are concave toward a direction approaching the light exit surface.

In some embodiments, the prism sheet includes a plurality of protrusions. The plurality of protrusions are located on a side of the prism sheet proximate to the light guide plate, and the plurality of protrusions are configured to make light passing through the plurality of protrusions converge.

In some embodiments, a protrusion includes a fourth side surface and a fifth side surface connected to the fourth side surface, and the fourth side surface is closer to the second light-emitting devices than the fifth side surface. An included angle between the fourth side surface and the fifth side surface is a fourth acute angle.

In some embodiments, the plurality of protrusions extend in a first direction. In a thickness direction of the substrate and in a second direction, a cross-sectional shape of a protrusion is a triangle. The first direction is parallel to an arrangement direction of the plurality of second light-emitting devices, and the first direction is perpendicular to the second direction.

In some embodiments, the fourth acute angle is in a range of 50° to 70°, inclusive.

In another aspect, a display apparatus is provided. The display apparatus includes the backlight module as described in any of the above embodiments, and a display panel located on a light-exit side of the backlight module.

In yet another aspect, an anti-peep display apparatus is provided. The anti-peep display apparatus includes the backlight module as described in any of the above embodiments, and a display panel located on a light-exit side of the backlight module.

In some embodiments, a display state of the anti-peep display apparatus includes a sharing state, a fully anti-peep state, and a local anti-peep state. The plurality of first light-emitting devices and the plurality of second light-emitting devices are configured such that the plurality of first light-emitting devices are in light-emitting states and the plurality of second light-emitting devices are in light-emitting states, so as to make the display state of the anti-peep display apparatus in the sharing state. Alternatively, the plurality of first light-emitting devices and the plurality of second light-emitting devices are further configured such that the plurality of first light-emitting devices are in non-light-emitting states and the plurality of second light-emitting devices are in the light-emitting states, so as to make the display state of the anti-peep display apparatus in the fully anti-peep state. Alternatively, the plurality of first light-emitting devices and the plurality of second light-emitting devices are further configured such that at least one first light-emitting device is in the non-light-emitting state, the remaining first light-emitting devices are in the light-emitting states, and the plurality of second light-emitting devices are in the light-emitting states, so as to make the display state of the anti-peep display apparatus in the local anti-peep state.

In another aspect, a driving method for an anti-peep display apparatus is provided. The driving method includes: a backlight module receiving a display state signal and analyzing the display state signal; and the backlight module controlling operating states of a plurality of corresponding first light-emitting devices and operating states of a plurality of second light-emitting devices according to the analyzed display state signal, so as to make the anti-peep display apparatus in a corresponding display state. A display state of the anti-peep display apparatus includes a sharing state, a fully anti-peep state and a local anti-peep state. In a case where the display state signal instructs the anti-peep display apparatus to switch to the sharing state, the backlight module controls the plurality of first light-emitting devices to emit light and controls the plurality of second light-emitting devices to emit light. In a case where the display state signal instructs the anti-peep display apparatus to switch to the fully anti-peep state, the backlight module controls the plurality of first light-emitting devices not to emit light and controls the plurality of second light-emitting devices to emit light. In a case where the display state signal instructs the anti-peep display apparatus to switch to the local anti-peep state, the backlight module controls first light-emitting devices in a target local region not to emit light and controls both remaining first light-emitting devices and the plurality of second light-emitting devices to emit light.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product to which the embodiments of the present disclosure relate.

DESCRIPTION OF THE INVENTION

Figure 1A:
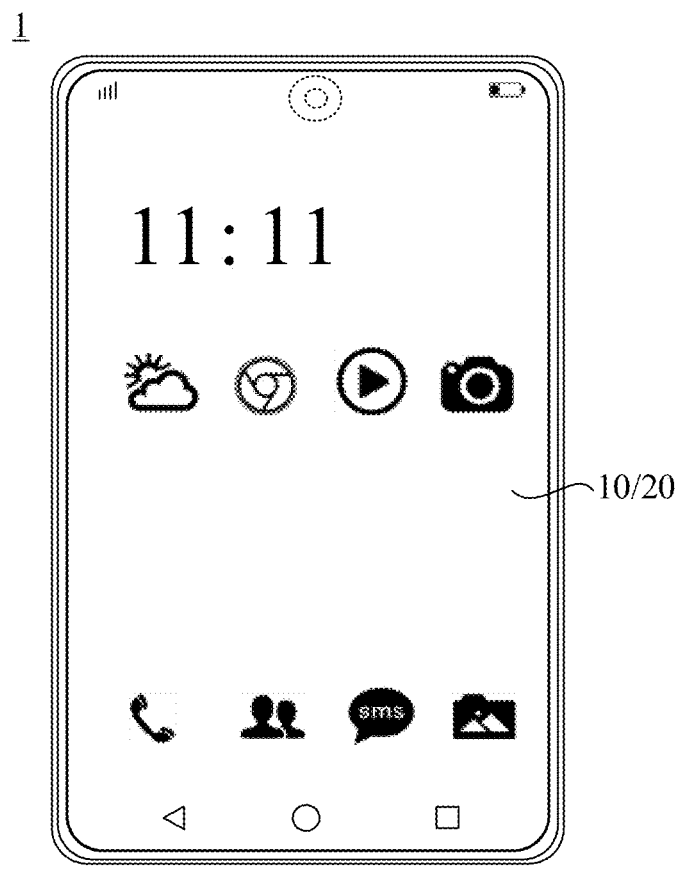
FIG. 1A is a structural diagram of a display apparatus, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

The phrase "A and/or B" includes the following three combinations: only A, only B, and a combination of A and B.

The phrase "applicable to" or "configured to" as used herein indicates an open and inclusive expression, which does not exclude apparatuses that are applicable to or configured to perform additional tasks or steps.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "perpendicular" includes absolute perpendicularity and approximate perpendicularity, and an acceptable range of deviation of the approximate perpendicularity may be a deviation within 5°; and the term "equal" includes absolute equality and approximate equality, and an acceptable range of deviation of the approximate equality may be a difference between two equals being less than or equal to 5% of either of the two equals.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

With the increasing demand for use experience by users, there are many display products or display apparatuses displayed with high contrast in the existing market. In addition, with the development of network technology, more and more people perform shopping or account transactions on the Internet. During the above operations, users often need to enter personal information on a display apparatus such as a computer, a mobile phone, an automatic teller machine, an automatic ticket dispenser, so that personal information may be prone to leakage. Therefore, anti-peep function of display devices or display apparatuses has received more and more widespread attention. The anti-peep function of existing display apparatuses is generally anti-peep of an entire display screen. However, with the diversification and personalization demand of users as well as an increase in sizes of display apparatuses, there is an urgent need to provide a display apparatus with a local anti-peep function to facilitate operations such as local sharing between multiple users.

As shown in FIG. 1A, some embodiments of the present disclosure provide a display apparatus 1. The display apparatus 1 may be any apparatus that displays images whether in motion (e.g., a video) or stationary (e.g., a still image), and regardless of text or image. More specifically, it is expected that the display apparatus in the embodiments may be implemented in or associated with a variety of electronic devices. The variety of electronic devices may include (but are not limit to), for example, mobile phones, wireless devices, personal digital assistants (PDAs), hand-held or portable computers, global positioning system (GPS) receivers/navigators, cameras, MPEG-4 Part 14 (MP4) video players, video cameras, game consoles, watches, clocks, calculators, TV monitors, flat-panel displays, computer monitors, car displays (e.g., odometer displays), navigators, cockpit controllers and/or displays, camera view displays (e.g., display of rear view camera in vehicles), electronic photos, electronic billboards or signs, projectors, architectural structures, packaging and aesthetic structures (e.g., displays for displaying an image of a piece of jewelry), etc. In some examples, the above display apparatus 1 may be a liquid crystal display (LCD) apparatus.

For example, the display apparatus 1 includes a frame, a display driver integrated circuit (IC) and other electronic components.

Figure 1B:
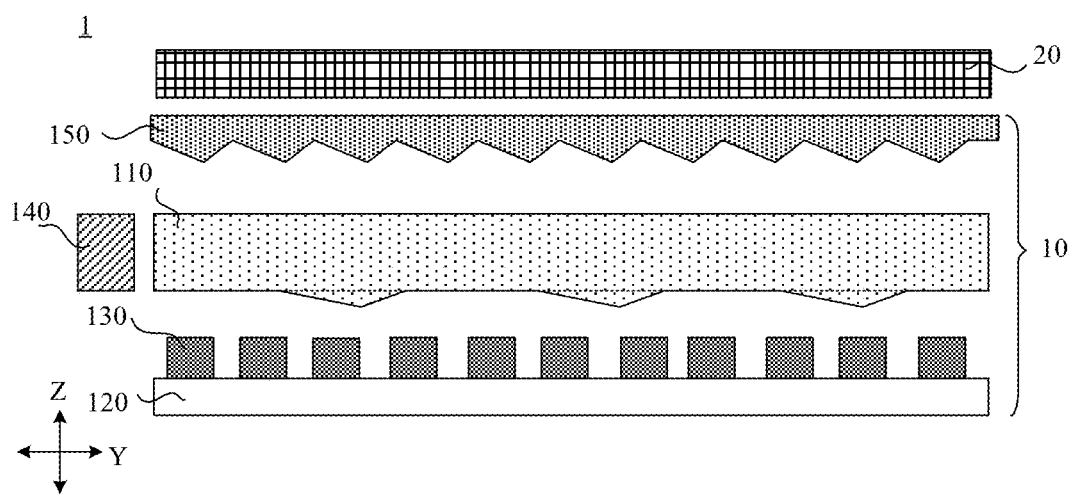
FIG. 1B is a structural diagram of another display apparatus, in accordance with some embodiments of the present disclosure.

In some examples, as shown in FIGS. 1A and 1B, the display apparatus 1 includes a backlight module 10 and a display panel 20. The display panel 20 is located on a light-exit side of the backlight module 10.

For example, the backlight module 10 is used to provide backlight for the display panel 20. The light-exit side of the backlight module 10 refers to a side of the backlight module 10 from which light exit.

For example, a driving mode of the display panel 20 may be a passive matrix (PM) driving mode or an active matrix (AM) driving mode. In a case where the driving mode of the display panel 20 is an active matrix driving mode, the display panel 20 may be, for example, a thin film transistor liquid crystal display (TFT-LCD) panel.

Figure 2:
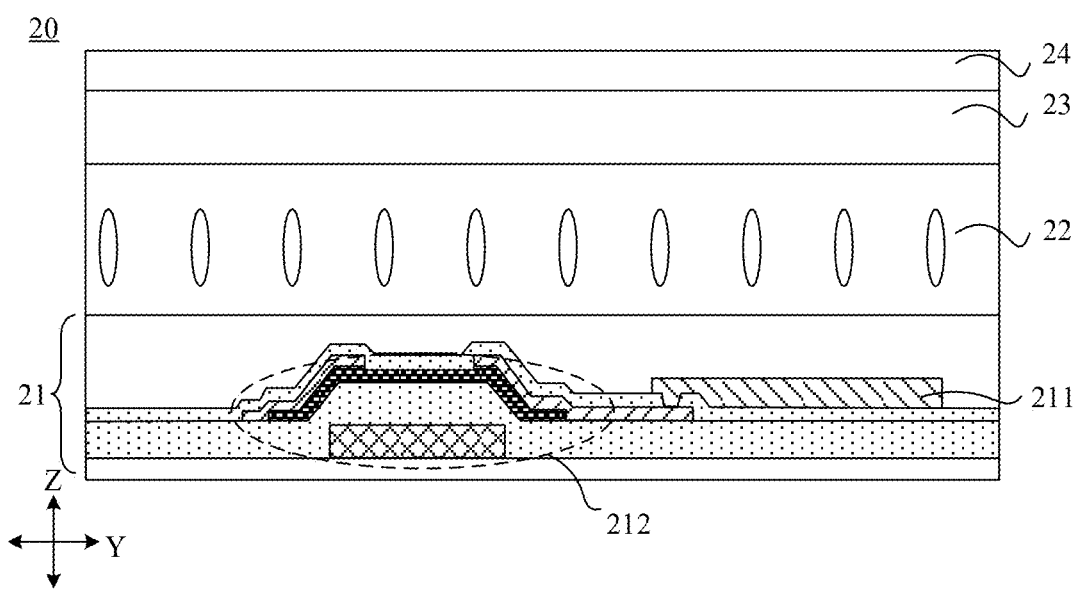
FIG. 2 is a structural diagram of a display panel, in accordance with some embodiments of the present disclosure.

For example, as shown in FIG. 2, the display panel 20 may include an array substrate 21, a liquid crystal layer 22, a color film substrate 23 and a polarizer 24 that are stacked in sequence.

For example, the array substrate 21 may include a plurality of pixel driving circuits 212 and a plurality of first pixel electrodes 211. The plurality of first pixel electrodes 211 are electrically connected to the plurality of pixel driving circuits 212 in one-to-one correspondence. The pixel driving circuit 212 provides a pixel voltage for the corresponding first pixel electrode 211.

For example, the display panel 20 further includes a first common electrode.

The provision position of the first common electrode is related to a display type of the display panel 20. In the embodiments of the present disclosure, the display type of the display panel 20 may be an advanced super-dimensional field switch (ADS) display type, an in-plane switching (IPS) display type, a vertical alignment (VA) display type, a fringe field switching (FFS) display type, a twisted nematic (TN) display type, etc. Therefore, the provision position of the first common electrode in the embodiments of the present disclosure may vary.

For example, in a case where the display panel 20 has an IPS display type, the first common electrode may be disposed in the array substrate 21 and disposed in the same layer as the first pixel electrode 211. Therefore, the first common electrode and the first pixel electrode 211 may be formed simultaneously in a patterning process, and thus the manufacturing process of the display panel 20 may be simplified.

As another example, in a case where the display panel 20 has a FFS display type or ADS display type, the first common electrode may be disposed in the array substrate 21 and located in a different layer from the first pixel electrode 211. Therefore, mutual interference between a pixel voltage signal on the first pixel electrode 211 and a common voltage on the first common electrode may be avoided, and the signal accuracy of the pixel voltage signal and the common voltage may be improved.

As another example, in a case where the display panel 20 has a TN display type or a VA display type, the first common electrode may be disposed in the color film substrate 23.

For example, the liquid crystal layer 22 includes a plurality of liquid crystal molecules. For example, by considering an example where the display panel 20 has a TN display type, an electric field may be generated between the first pixel electrode 211 and the first common electrode, and liquid crystal molecules located between the first pixel electrode 211 and the first common electrode may deflect due to action of the electric field.

For example, the color film substrate 23 includes a variety of color filters. For example, in a case where the backlight provided by the backlight module 10 is a white light, the color filters may include red filters, green filters and blue filters. For example, the red filter may only allow a red light in the incident light to pass through, the green filter may only allow a green light in the incident light to pass through, and the blue filter may only allow a blue light in the incident light to pass through. As another example, in a case where the backlight provided by the backlight module 10 is a blue light, the color filters may include red filters and green filters.

Of course, the color film substrate 23 further includes a black matrix. The black matrix may be used to prevent mixture of light.

For example, the polarizer 24 may absorb light with a polarization direction the same as a direction of an absorption axis of the polarizer 24, so that the light with the polarization direction the same as the transmission direction of the polarizer 24 to pass through. As a result, the light passing through the polarizer 24 is linearly polarized light.

It can be understood that the backlight provided by the backlight module 10 may pass through the array substrate 21 to be incident on the liquid crystal molecules in the liquid crystal layer 22. The liquid crystal molecules deflect to a certain extent due to the action of the electric field generated between the first pixel electrode 211 and the first common electrode, so as to change the polarization direction of the light passing through the liquid crystal molecules, so that the light exiting from the polarizer 24 reaches a preset brightness. The above light exits after passing through filters of different colors in the color film substrate 23. The exiting light includes lights of various colors such as a red light, a green light and a blue light. The lights of various colors exit after passing through the polarizer 24, and the exiting lights cooperate with each other to enable the display apparatus 1 to achieve display.

Figure 3A:
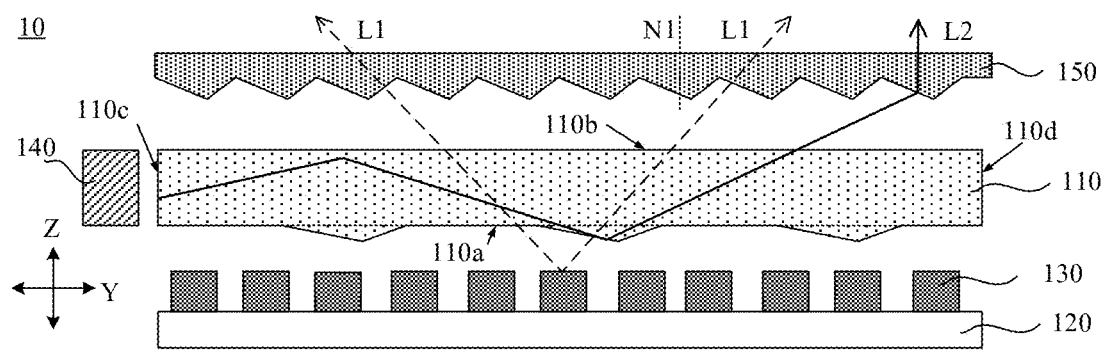
FIG. 3A is a structural diagram of a backlight module, in accordance with some embodiments of the present disclosure.

In some embodiments, as shown in FIG. 3A, the above backlight module 10 includes a light guide plate 110, a substrate 120, a plurality of first light-emitting devices 130, a plurality of second light-emitting devices 140 and a prism sheet 150.

For example, the light guide plate 110 has a bottom surface 110a and a light exit surface 110b that are provided oppositely, and a light incident surface 110c that connects the bottom surface 110a and the light exit surface 110b.

The substrate 120 is located on a side of the bottom surface 110a away from the light exit surface 110b. The plurality of first light-emitting devices 130 are located on a side of the substrate 120 proximate to the bottom surface 110a. The substrate 120 is configured to control operating states of the plurality of first light-emitting devices 130.

For example, the substrate 120 may be a glass substrate, a printed circuit board (PCB) substrate, or the like.

Figure 4:
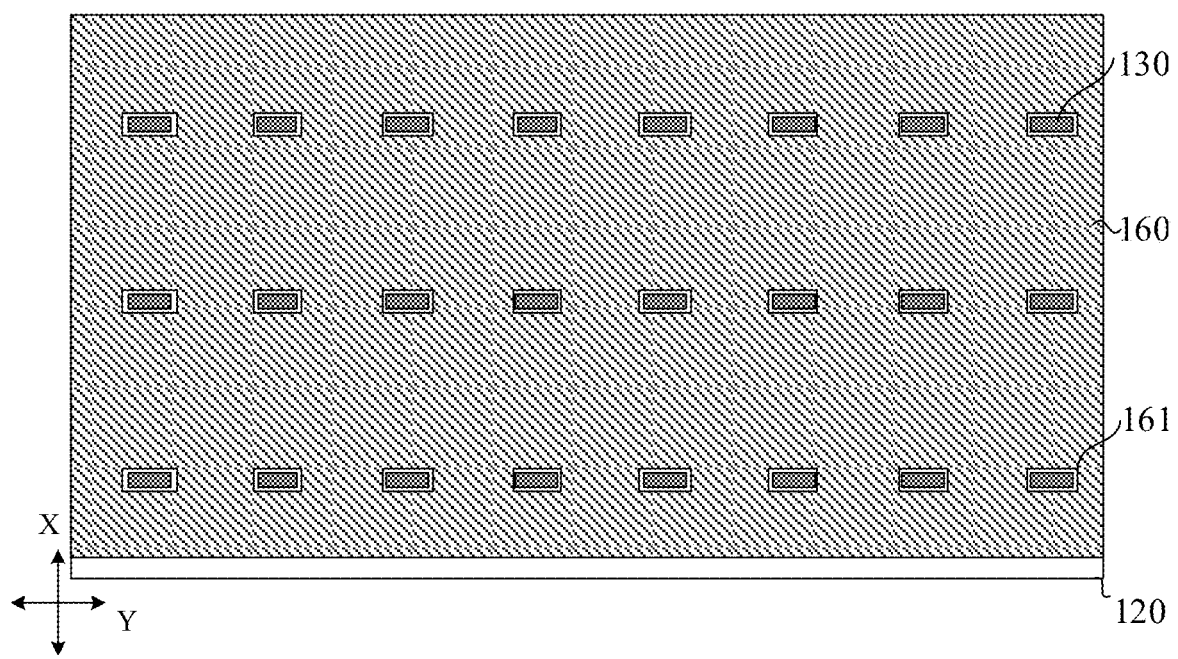
FIG. 4 is a structural diagram of a substrate and a first light-emitting device, in accordance with some embodiments of the present disclosure.

For example, as shown in FIG. 4, the plurality of first light-emitting devices 130 are arranged in an array. Each row of first light-emitting devices 130 are arranged in a second direction Y, and each column of first light-emitting devices 130 are arranged in a first direction X.

For example, the operating state of the first light-emitting device 130 may be a light-emitting state or a non-lightemitting state. Optionally, under the control of the substrate 120, the operating states of the plurality of first light-emitting devices 130 may be the same. For example, the plurality of first light-emitting devices 130 may all be in the light-emitting states or all in the non-light-emitting states. Optionally, under the control of the substrate 120, the operating states of the plurality of first light-emitting devices 130 may be different. For example, under the control of the substrate 120, an operating state of at least one first light-emitting device 130 located in a central region of the backlight module 10 is the non-light-emitting state, while operating states of multiple first light-emitting devices 130 located in other regions of the backlight module 10 are the light-emitting states.

In some examples, as shown in FIG. 3A, the plurality of first light-emitting devices 130 are configured to emit first light L1, so that the first light L1 passes through the light guide plate 110 and the prism sheet 150 to become light of a first viewing angle. For example, the light of the first viewing angle refers to light exiting within an angle range corresponding to the first viewing angle. In some examples, the plurality of second light-emitting devices 140 are provided opposite to the light incident surface 110c of the light guide plate 110. Second light L2 emitted by the plurality of second light-emitting devices 140 enters the light guide plate 110 through the light incident surface 110c of the light guide plate 110.

In some examples, as shown in FIG. 3A, the prism sheet 150 is located on a side of the light guide plate 110 away from the substrate 120. The prism sheet 150 is configured to cooperate with the light guide plate 110 to modulate the second light L2 emitted by the plurality of second light-emitting devices 140 into light of a second viewing angle.

For example, the light of the second viewing angle refers to light exiting within an angle range corresponding to the second viewing angle.

In some examples, the first viewing angle is larger than the second viewing angle.

Figure 3B:
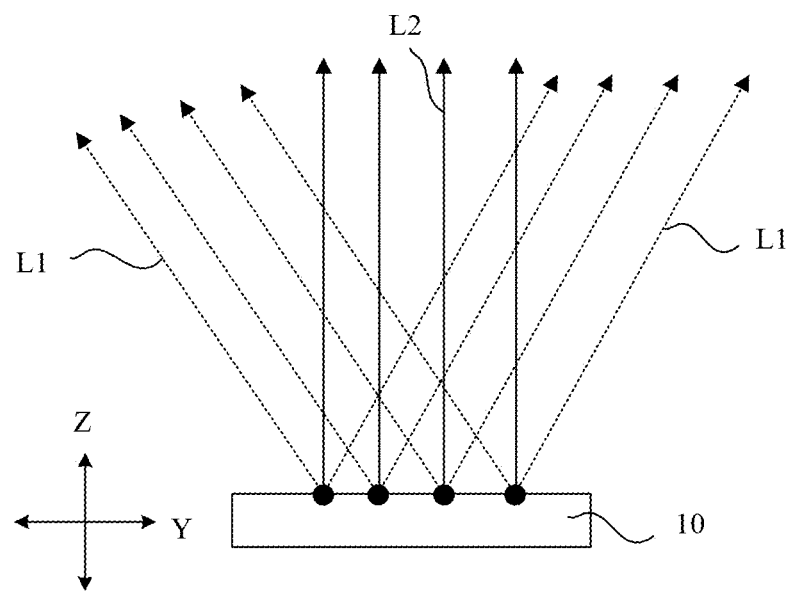
FIG. 3B is a schematic diagram of first light and second light provided by a backlight module, in accordance with some embodiments of the present disclosure.

For example, as shown in FIG. 3A, an exit angle range of light, exiting through the light guide plate 110 and the prism sheet 150, in the first light L1 is larger than an exit angle range of light, exiting through the light guide plate 110 and the prism sheet 150, in the second light L2. Therefore, as shown in FIGS. 3A and 3B, in a case where the first light-emitting devices 130 and the second light-emitting devices 140 of the backlight module 10 are both in light-emitting states, the users may see the first light L1 emitted by the first light-emitting devices 130 from a larger viewing angle and see the second light L2 emitted by the second light-emitting devices 140 from a smaller viewing angle.

For example, the light of the first viewing angle may be diffused light. The first light L1 emitted by the first light-emitting devices 130 become scattered light after exiting from the prism sheet 150. Most of the diffused light is light with an exit direction deviated from a normal direction of the prism sheet 150 and is non-collimated light. The users may see the light when viewing the backlight module 10 from a non-front viewing angle or non-direct viewing angle.

For example, the light of the second viewing angle may be a collimated light. The second light L2 emitted by the second light-emitting devices 140 become the collimated light after passing through the light incident surface 110c and the light exit surface 110b of the light guide plate 110 and the prism sheet 150 in sequence. The users may see the light when viewing the backlight module 10 from a front viewing angle or direct viewing angle. It can be understood that a viewing angle range corresponding to the non-collimated light is larger than a viewing angle range of the collimated light.

Of course, the light of the second viewing angle may alternatively be non-collimated light.

For example, as shown in FIG. 3A, the range of the first viewing angle may be greater than 30°, and an included angle between an exit direction of a light of the first viewing angle and a normal line N1 of the backlight module 10 is greater than 30°. The range of the second viewing angle may be less than or equal to 30°, and an included angle between an exit direction of a light of the second viewing angle and the normal line N1 of the backlight module 10 is less than or equal to 30°.

For example, the first viewing angle may be 31°, 37°, 45°, 60° or 80°.

As another example, the second viewing angle may be 0°, 5°, 10°, 20° or 30°.

In some examples, the operating states of the plurality of first light-emitting devices 130 and the plurality of second light-emitting devices 140 are related to a display state of the display apparatus 1.

For example, the first light emitted by the first light-emitting devices 130 at different positions exit from corresponding different regions of the backlight module 10 to be the light of the first viewing angle, thereby providing the backlight of the first viewing angle for different display regions of the display panel 20.

For example, in a case where a certain number of first light-emitting devices 130 do not emit light and the plurality of second light-emitting devices 140 all emit light, a first sub-region of the backlight module may be caused to only emit light of a relatively small second viewing angle, all regions of the backlight module may be caused to emit light of the second viewing angle, and regions of the backlight module 10 except for the first sub-region may be caused to emit light of the first viewing angle. Therefore, in a case where the backlight module is applied to the display apparatus, the users may view display an image of the entire display region of the display apparatus from the second viewing angle, and the users may view an image of a region of the display apparatus except for a first region from a relatively large viewing angle, so that a display state of any local region and an entire display region of the display apparatus may be controlled. The above first sub-region may be a light-exit region of the backlight module corresponding to the certain number of first light-emitting devices 130. The above first region is a corresponding region, of the display panel or the display apparatus, on which the light exiting from the first sub-region of the backlight module is incident.

For example, the display state of the display apparatus 1 includes a sharing state, a fully anti-peep state, and a local anti-peep state.

For example, the above sharing state means that the users may view all the display image of the display region of the display panel from different viewing angles of the display apparatus 1. The above fully anti-peep state means that the users may view the entire display image of the display region of the display panel only from a small viewing angle (such as front view) of the display apparatus 1, but cannot view the display image of the display region of the display panel or cannot clearly view the display content of the display region from other large viewing angles (such as side view). The above local anti-peep state means that the users may view a display image of a certain local display region of the display apparatus 1 only from a small viewing angle (such as a front viewing angle), but cannot view or cannot clearly view the display image of the local display region from other large angle viewing angles (such as a side viewing angle).

For example, in a case where the plurality of first light-emitting devices 130 all emit light and the plurality of second light-emitting devices 140 all emit light, the backlight module 10 may emit light of the first viewing angle and light of the second viewing angle to provide the backlight of the first viewing angle and the backlight of the second viewing angle for the entire display region of the display panel. Then, the display apparatus 1 is in the sharing state, and the users may view the display image of the entire display region of the display apparatus from both the larger viewing angle and the smaller viewing angle of the display apparatus.

As another example, in a case where none of the plurality of first light-emitting devices 130 emit light and the plurality of second light-emitting devices 140 all emit light, the backlight module 10 may emit light of the second viewing angle to provide the backlight of the relatively small second viewing angle for the entire display region of the display panel. The users may view the image of the entire display region of the display apparatus from a relatively small viewing angle. The backlight module 10 cannot emit light of the first viewing angle and cannot provide the backlight of the first viewing angle for the entire display region of the display panel. The users may not be able to view the image of the entire display region of the display apparatus from a relatively large viewing angle. The display apparatus is in the fully anti-peep state.

Figure 1C:
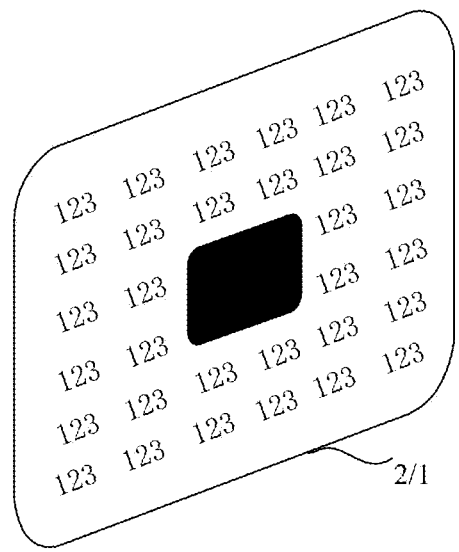
FIG. 1C is a schematic diagram of yet another display apparatus or an anti-peep display apparatus, in accordance with some embodiments of the present disclosure.

As another example, in a case where some of the first light-emitting devices 130 do not emit light (the first light-emitting devices 130 in the first sub-region do not emit light) and the remaining first light-emitting devices 130 emit light, and the plurality of second light-emitting devices 140 all emit light, the first sub-region of the backlight module 10 may only emit light of a relatively small second viewing angle, and the first sub-region of the backlight module 10 cannot emit light of a relatively large first viewing angle. All regions of the backlight module 10 may emit light of the second viewing angle, and regions of the backlight module 10 except for the first sub-region may emit light of the first viewing angle. Then the users may view the image displayed on the entire display region of the display apparatus from a smaller viewing angle, and the users may view the image of the region of the display apparatus except for the first region from a larger viewing angle, while the users cannot view the image of the first region of the display apparatus from the larger viewing angle. Thus, the anti-peep treatment may be performed on the first region, so that the display apparatus is in a local anti-peep state, thereby achieving local anti-peep. The above first sub-region may be a light-exit region of the backlight module corresponding to the above some of the first light-emitting devices 130. The above first region is a region, of the display panel or the display apparatus, on which the light exiting from the first sub-region of the backlight module is incident. By considering FIG. 1C as an example, a central black region of the display apparatus 1 in FIG. 1C represents the first region where the display image cannot be seen from the side viewing angle (or the first viewing angle).

As shown in FIG. 3A, some embodiments of the present disclosure provide a backlight module 10. The backlight module 10 includes a light guide plate 110, a substrate 120, a plurality of first light-emitting devices 130, a plurality of second light-emitting devices 140 and a prism sheet 150. The first light-emitting devices 130 are located on a side of the substrate 120 proximate to the bottom surface 110a of the light guide plate 110, and the first light L1 emitted by the first light-emitting device 130 passes through the light guide plate 110 and the prism sheet 150 to be the light of the first viewing angle. The second light-emitting devices 140 are provided opposite to the light incident surface 110c of the light guide plate 110, and the second light L2 emitted by the second light-emitting device 140 passes through the light guide plate 110 and the prism sheet 150 to be modulated into the light of the second viewing angle. The first viewing angle is larger than the second viewing angle. The operating states of the plurality of first light-emitting devices 130 are controlled by the substrate 120, and thus different display states of the display apparatus 1 may be achieved.

In a case where the display apparatus 1 is in the sharing state, the plurality of second light-emitting devices 140 emit light of the second viewing angle, and the substrate 120 controls the plurality of first light-emitting devices 130 to emit light of the first viewing angle, so that the backlight module 10 may provide the backlight of the first viewing angle and the second viewing angle for the entire display region of the display panel. As a result, the users may view the display image of the entire display region of the display apparatus from both a substantial front viewing angle (within a smaller second viewing angle range) and a side viewing angle (within a larger first viewing angle range). In a case where the display apparatus 1 is in the fully anti-peep state, the plurality of second light-emitting devices 140 emit light of the second viewing angle, and the substrate 120 controls the plurality of first light-emitting devices 130 not to emit light, so that the backlight module 10 may only provide the backlight of the second viewing angle for the entire display region of the display panel 20. As a result, the users may view the display image of the entire display region of the display apparatus from a substantial front viewing angle. In a case where the display apparatus 1 is in the local anti-peep state, the plurality of second light-emitting devices 140 emit light of the second viewing angle, and the substrate 120 controls some of the first light-emitting devices 130 not to emit light, so that the backlight module 10 provides the backlight of the second viewing angle for the entire display region of the display panel 20, and the backlight module 10 provides the backlight of the first viewing angle for display region of the display panel 20 except for the first region. As a result, the users may view the image of the region of the display apparatus except for the first region from a relatively large viewing angle, and the users may view the image display on the entire display region of the display apparatus from a relatively small viewing angle, thereby realizing a dynamic anti-peep function for any local region of the display apparatus.

It can be understood that there are a plurality of ways for the substrate 120 to control the operating states of the plurality of first light-emitting devices 130, which may be set according to actual situations, and is not limited in the present disclosure.

Figure 5A:
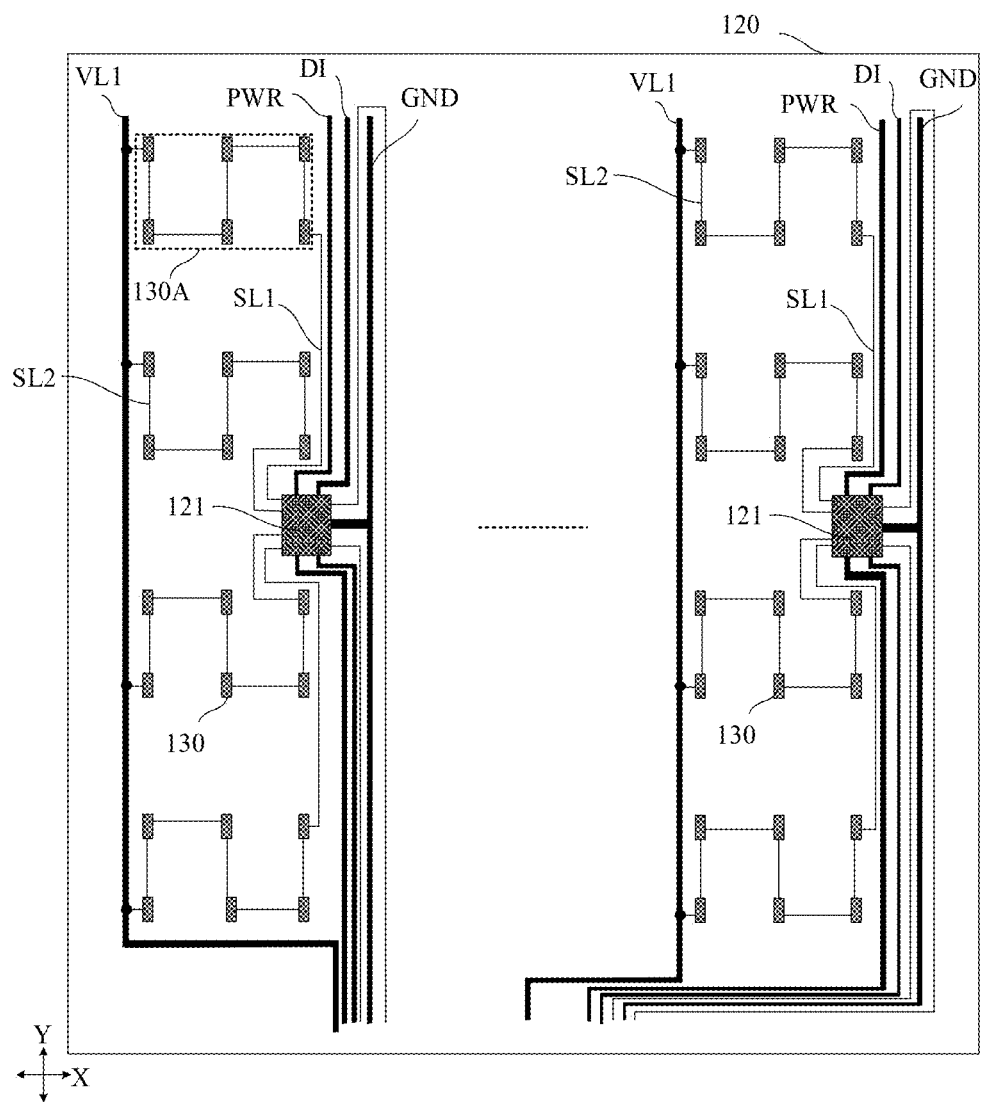
FIG. 5A is a structural diagram of another substrate and another first light-emitting device, in accordance with some embodiments of the present disclosure.
Figure 5B:
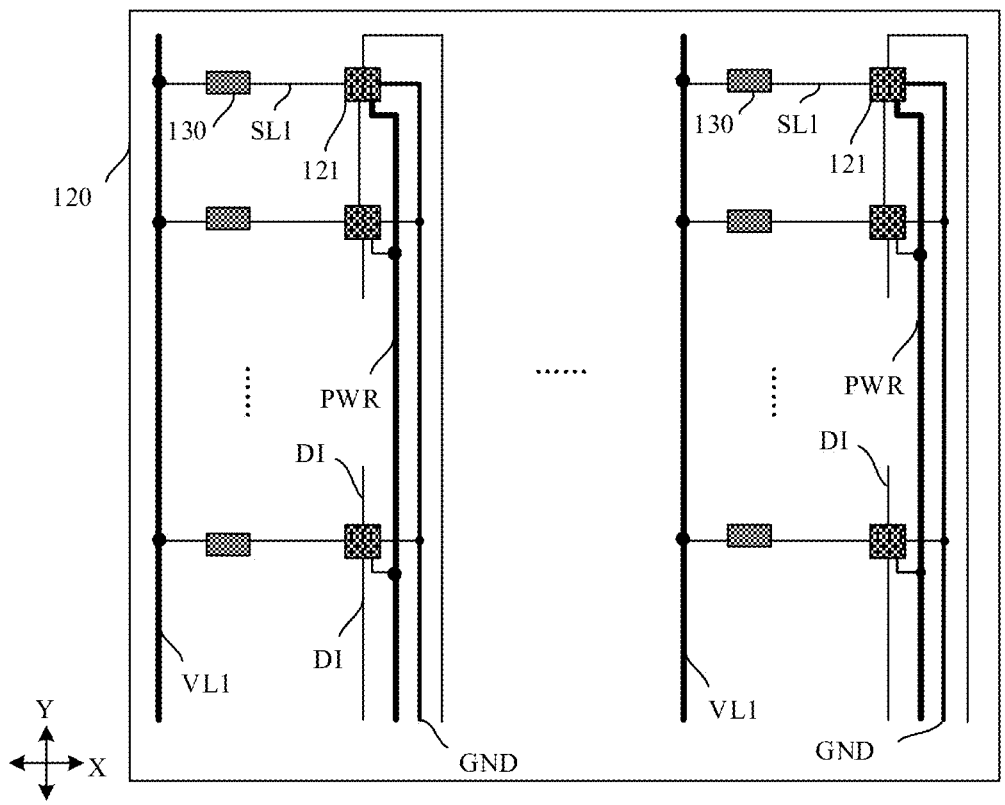
FIG. 5B is a structural diagram of yet another substrate and yet another first light-emitting device, in accordance with some embodiments of the present disclosure.

In some embodiments, as shown in FIGS. 5A and 5B, the substrate 120 includes a plurality of chips 121. The plurality of chips 121 may be arranged in multiple rows and multiple columns. A chip 121 is electrically connected to at least one first light-emitting device 130.

For example, as shown in FIG. 5B, a chip 121 is electrically connected to a first light-emitting device 130, and the chip 121 controls an operating state of the corresponding first light-emitting device 130.

As another example, as shown in FIG. 5A, a chip 121 is electrically connected to multiple first light-emitting devices 130, and the chip 121 controls operating states of the corresponding multiple first light-emitting devices 130.

It can be understood that each chip 121 works independently, and thus operating state(s) of the first light-emitting device(s) 130 electrically connected thereto may be controlled to be different. For example, a chip 121 controls the corresponding first light-emitting device(s) 130 to be in light-emitting states, while the other chips 121 each control the corresponding first light-emitting device(s) 130 to be in non-light-emitting states.

For example, in a case where a chip 121 is electrically connected to multiple first light-emitting devices 130, there are a plurality of ways of electrical connection between the multiple first light-emitting devices 130 and the chip 121, which may be set according to actual needs, and is not limited in the embodiments of the present disclosure.

For example, the multiple first light-emitting devices 130 are all electrically connected to the chip 121.

As another example, as shown in FIG. 5A, at least two first light-emitting devices 130 are connected in series to form a first light-emitting device group 130A, and at least one first light-emitting device group 130A is electrically connected to the chip 121.

With the above provision, the chips 121 in the substrate 120 may be used to achieve independent control of the operating states of the plurality of first light-emitting devices 130, so that different local regions of the backlight module 10 may emit light of the first viewing angle. In a case where the above backlight module 10 is applied to the display apparatus 1, the users may view an image displayed on a second region of the display apparatus corresponding to the above local region from a viewing angle within a relatively large first viewing angle range, and cannot view an image displayed on other regions other than the second region from a viewing angle within the relatively large first viewing angle range, thereby realizing a local anti-peep function of any region of the display apparatus 1.

Figure 5C:
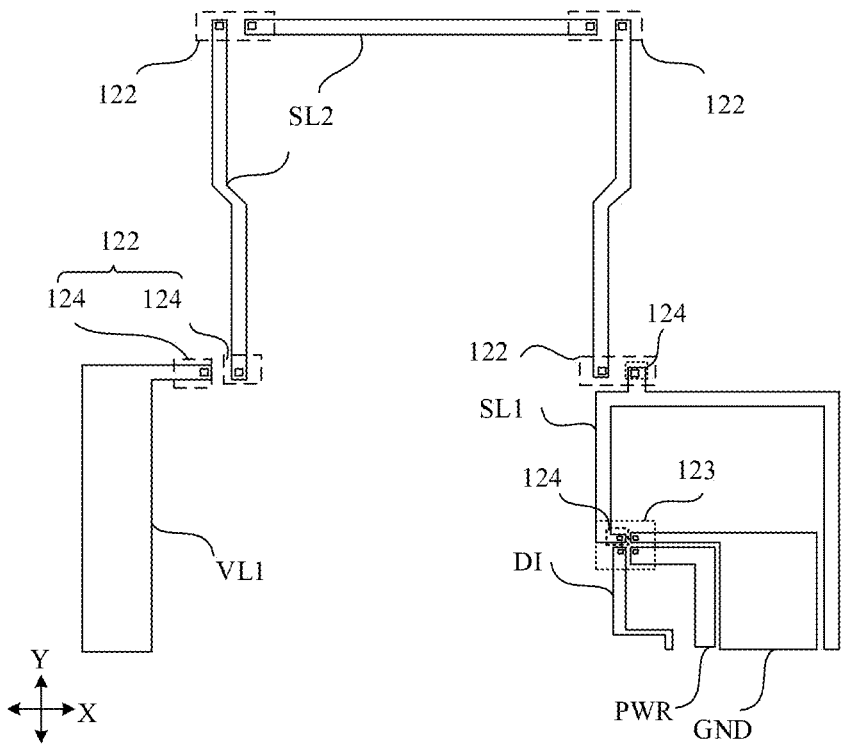
FIG. 5C is a partial structural diagram of a substrate, in accordance with some embodiments of the present disclosure.

In some examples, as shown in FIG. 5C, the substrate further includes a plurality of first pad groups 122 and a plurality of second pad groups 123.

For example, the first pad group 122 includes at least two adjacent pads 124. For example, the first pad group 122 includes two adjacent pads 124. As another example, the first pad group 122 includes three adjacent pads 124.

For example, the second pad group 123 includes at least four adjacent pads 124. For example, the second pad group 123 includes four adjacent pads 124. As another example, the second pad group 123 includes five adjacent pads 124.

For example, the first pad group 122 is electrically connected to the first light-emitting device 130, and the second pad group 123 is electrically connected to the chip 121. A pad 124 of the second pad group 123 is electrically connected to a pad 124 of at least one first pad group 122. That is, the electrical connection between the chip 121 and the first light-emitting device(s) 130 is achieved by the electrical connection between the pad(s) 124 of the first pad group(s) 122 and the pad 124 of the second pad group 123.

For example, the first light-emitting device 130 includes a first pin and a second pin. The two pads of the first pad group 122 are electrically connected to the first pin and the second pin of the first light-emitting device 130, respectively.

For example, as shown in FIG. 5C, a pad 124 of the second pad group 123 is electrically connected to a pad 124 of the first pad group 122.

As another example, in a case where a chip 121 is electrically connected to a plurality of first light-emitting device groups, a pad 124 of the second pad group 123 is electrically connected to a pad 124 of each first pad group 122 in multiple first pad groups 122.

With the above provision, the chip 121 may control operating state(s) of the corresponding first light-emitting device(s) 130 according to received signals, so that operating states of the plurality of first light-emitting devices 130 may be different. For example, the substrate 120 controls an operating state of at least one first light-emitting device 130 to be a light-emitting state, and operating states of the remaining first light-emitting devices 130 to be non-light-emitting states.

In this case, a local region of the backlight module 10 corresponding to the at least one first light-emitting device 130 may present light of the first viewing angle, and a local region of the backlight module 10 corresponding to the remaining first light-emitting devices 130 has no light. Therefore, in a case where the backlight module 10 is applied to the display apparatus 1, the users may view an image displayed on the local region from a viewing angle within a relatively large first viewing angle range, and cannot view an image displayed on other regions other than the local region from the relatively large viewing angle, thereby realizing a local anti-peep function of any region of the display apparatus 1.

In some examples, as shown in FIGS. 5A and 5B, the substrate 120 further include a plurality of first voltage lines VL1 and a plurality of first connection lines SL1.

For example, the plurality of first voltage lines VL1 are arranged in the first direction X, and extend in the second direction Y.

For example, the first direction X intersects the second direction Y.

For example, an included angle between the first direction X and the second direction Y may be 85°, 90°, 95°, 105° or 110°.

The embodiments of the present disclosure will be introduces by considering an example where the included angle between the first direction X and the second direction Y is 90°.

For example, as shown in FIG. 5O, a first voltage line VL1 is electrically connected to a pad 124 of at least one first pad group 122. For example, a first voltage line VL1 is electrically connected to a pad 124 of a first pad group 122. As another example, a first voltage line VL1 is electrically connected to a pad 124 of each first pad group 122 in multiple first pad groups 122.

For example, the first voltage line VL1 may transmit a first voltage signal to corresponding first light-emitting device(s) 130 through the pad(s) 124 of the first pad group(s) 122 electrically connected thereto.

For example, a first connection line SL1 is electrically connected to a pad 124 of a second pad group 123 and a pad 124 of a first pad group 122.

For example, the chip 121 and the first light-emitting device 130 are electrically connected by the first connection line SL1. The chip 121 may transmit a signal to a corresponding first light-emitting device 130 through the first connection line SL1, so that the chip 121 and the substrate 120 may control an operating state of the first light-emitting device 130.

With the above provision, the chip 121 and the first light-emitting device 130 may be electrically connected, so that the chip 121 and the substrate 120 may control the operating state of the corresponding first light-emitting device 130, thereby realizing a local anti-peep function of any region of the display apparatus 1.

In some examples, as shown in FIG. 5A, in a case where a chip 121 is electrically connected to multiple first light-emitting devices 130, the substrate 120 further includes a plurality of second connection lines SL2.

For example, as shown in FIG. 5C, a second connection line SL2 is electrically connected to pads 124 of two adjacent first pad groups 122. The second connection line SL2 may make multiple first light-emitting devices 130 connected in series, so that the multiple first light-emitting devices 130 connected in series form a first light-emitting device group 130A. Thus, the chip 121 may control an operating state of at least one first light-emitting device group 130A.

With the above provision, the number of chips 121 provided on the substrate 120 may be reduced, and the number of first light-emitting devices 130 controlled by a chip 121 may increase, thereby saving the manufacturing cost of the substrate 120 and the backlight module 10.

In some examples, as shown in FIGS. 5A and 5B, the substrate 120 further includes a plurality of address signal lines DI, and a plurality of common voltage signal lines GND and a plurality of power supply voltage signal lines PWR.

For example, multiple pads 124 of the second pad group 123 are electrically connected to a common voltage signal line GND, a power supply voltage signal line PWR and an address signal line DI, respectively.

For example, the common voltage signal line GND is electrically connected to the chip 121 by a pad 124. The common voltage signal line GND may transmit a common voltage signal for the chip 121. The power supply voltage signal line PWR is electrically connected to the chip 121 by a pad 124. The power supply voltage signal line PWR may transmit a power supply voltage signal for the chip 121. The address signal line DI is electrically connected to the chip 121 by a pad 124. The address signal line DI may transmit an addressing signal for the chip 121.

With the above provision, the chip 121 may receive a corresponding common voltage signal, a corresponding power supply voltage signal and the like through the pads 124, so that the chip 121 may control the operating state(s) of the first light-emitting device(s) 130 electrically connected thereto, and thus the backlight module 10 may provide the backlight of the first viewing angle for a local region or the entire region. Furthermore, in a case where the backlight module 10 is applied to the display apparatus 1, the backlight of the first viewing angle and the display panel are combined to realize a local anti-peep function of any region of the display apparatus 1.

Figure 6A:
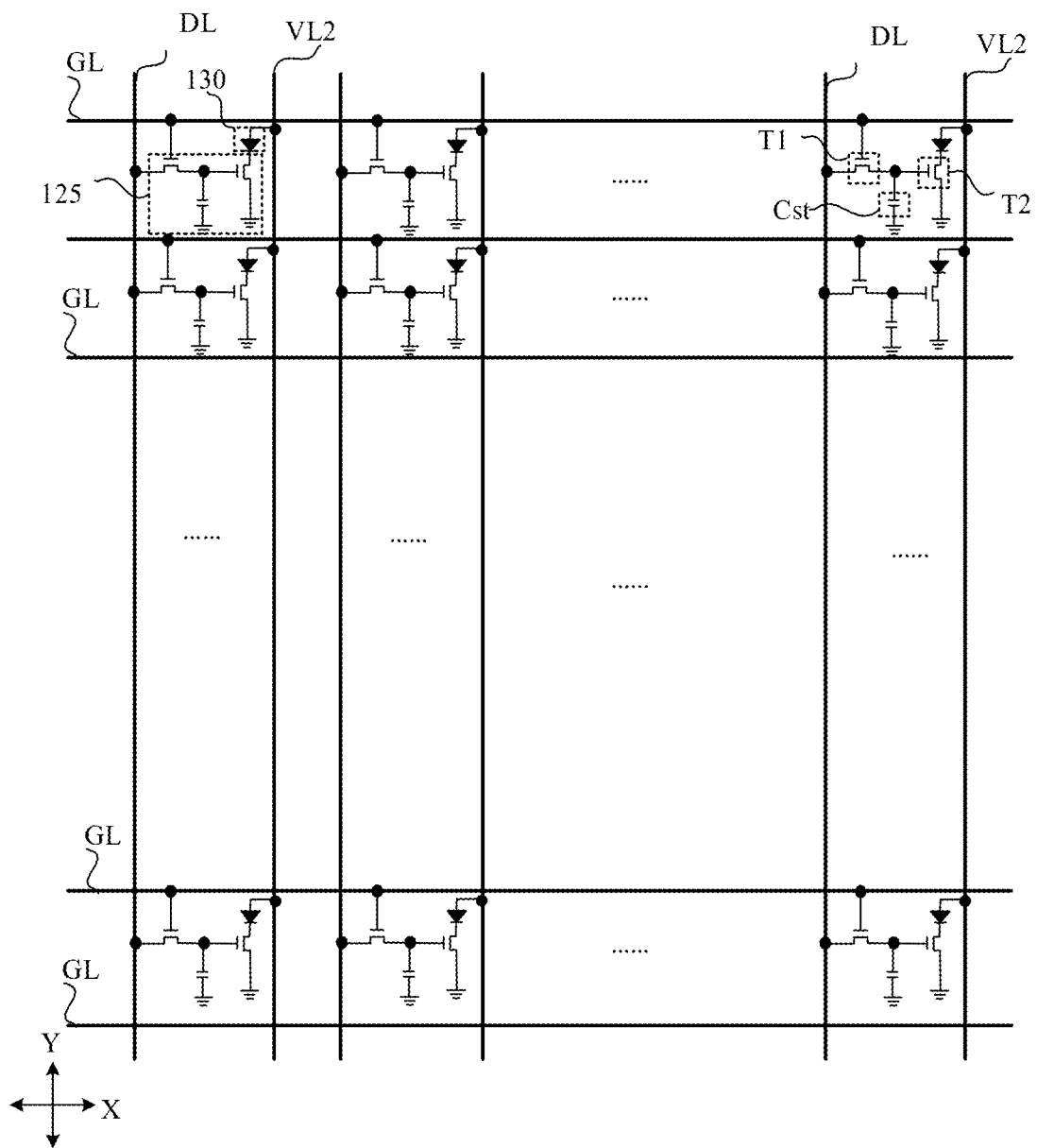
FIG. 6A is a structural diagram of yet another substrate and yet another first light-emitting device, in accordance with some embodiments of the present disclosure.

In some other embodiments, as shown in FIG. 6A, the substrate 120 includes a plurality of driving circuits 125. The plurality of driving circuits 125 may be arranged in multiple rows and multiple columns.

Figure 6B:
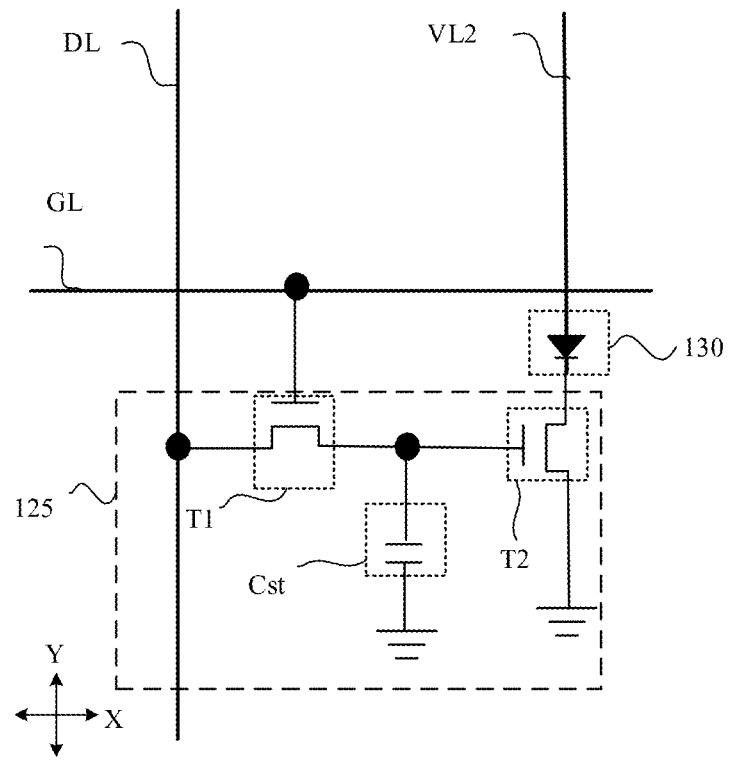
FIG. 6B is a structural diagram of a driving circuit and a first light-emitting device, in accordance with some embodiments of the present disclosure.
Figure 6C:
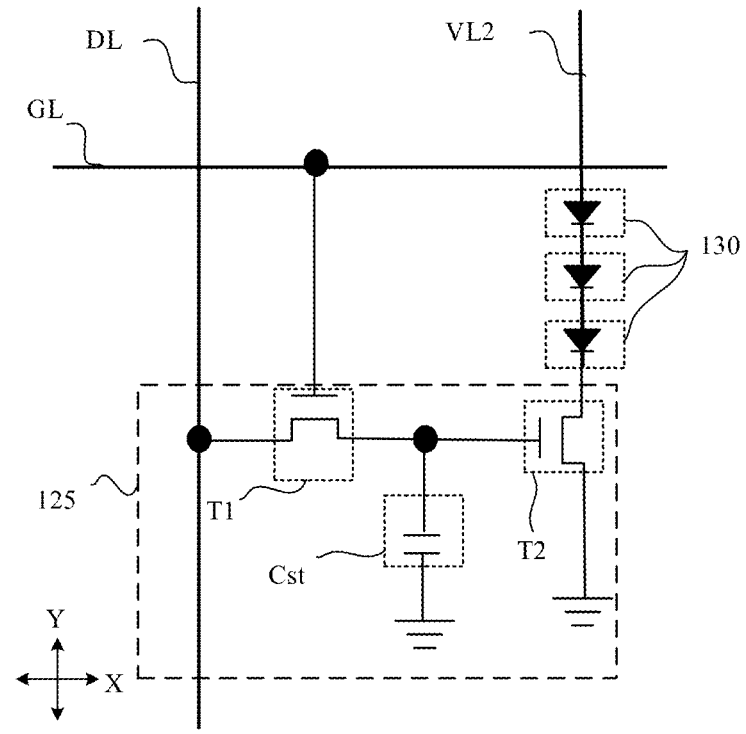
FIG. 6C is a structural diagram of another driving circuit and another first light-emitting device, in accordance with some embodiments of the present disclosure.

In some examples, as shown in FIGS. 6B and 6C, a driving circuit 125 is electrically connected to at least one first light-emitting device 130.

For example, as shown in FIG. 6B, a driving circuit 125 is electrically connected to a first light-emitting device 130. As another example, as shown in FIG. 6C, a driving circuit 125 is electrically connected to multiple first light-emitting devices 130, and the multiple first light-emitting devices 130 may be connected in series.

The driving circuit 125 transmits a control signal to the first light-emitting device(s) 130 electrically connected thereto, so as to control operating state(s) of the first light-emitting device(s) 130. It can be understood that each driving circuit 125 works independently and thus operating state(s) of the first light-emitting device(s) 130 electrically connected thereto may be controlled to be different. For example, driving circuits 125 in a first row control the corresponding first light-emitting devices 130 to be in the light-emitting states, and driving circuits 125 in a second row may control the corresponding first light-emitting devices 130 to be in the non-light-emitting states.

The above provision provides a way for the substrate 120 controlling operating states of the first light-emitting devices 130. Therefore, the plurality of driving circuits 125 on the substrate 120 may be used to individually control the operating states of the plurality of first light-emitting devices 130. Different first light-emitting devices 130 correspond to regions where the light of the first viewing angle and exiting from the backlight module 10 are located, so that the region where the light of the first viewing angle and exiting from the backlight module 10 is located may be flexibly changed, so as to realize a local anti-peep function of the display apparatus.

It can be understood that the above driving circuit 125 has a varying structure, which may be selected according to actual needs and is not limited in the embodiments of the present disclosure.

In some examples, as shown in FIG. 6A, the substrate 120 further includes a plurality of scan signal lines GL, a plurality of data signal lines DL and a plurality of second voltage lines VL2.

For example, the plurality of scan signal lines GL extend in the first direction X, and the plurality of data signal lines DL extend in the second direction Y.

For example, as shown in FIGS. 6B and 6C, the driving circuit 125 at least includes a first transistor T1, a second transistor T2 and a storage capacitor Cst.

For example, as shown in FIGS. 6B and 6C, the driving circuit 125 may include the first transistor T1, the second transistor T2 and the storage capacitor Cst.

As another example, the driving circuit 125 may include three transistors and two storage capacitors.

The following will provide an introduction by considering an example where the driving circuit 125 includes the first transistor T1, the second transistor T2 and the storage capacitor Cst, and the driving circuit 125 is electrically connected to a first light-emitting device 130.

As shown in FIGS. 6B and 6C, a control electrode of the first transistor T1 is electrically connected to a scan signal line GL, a first electrode of the first transistor T1 is electrically connected to a data signal line DL, and a second electrode of the first transistor T1 is electrically connected to a first electrode of the storage capacitor Cst.

For example, the first transistor T1 is turned on under control of a scan signal provided by the scan signal line GL. The first transistor T1 transmits a data signal from the data signal line DL to the first electrode of the storage capacitor Cst, so as to charge the storage capacitor Cst. A second electrode of the storage capacitors Cst is grounded.

For example, a control electrode of the second transistor T2 is electrically connected to the first electrode of the storage capacitor Cst, a first electrode of the second transistor T2 is electrically connected to a first electrode of a first light-emitting device 130, and a second electrode of the second transistor T2 is grounded. A second electrode of the first light-emitting device 130 is electrically connected to a second voltage line VL2.

For example, the second transistor T2 is turned on under control of a voltage signal stored in the storage capacitor Cst. The second transistor T2 make the first light-emitting device 130 and the second electrode of the second transistor T2 produce a communicating path therebetween, so that a second voltage from the second voltage line VL2 may be transmitted to the first light-emitting device 130, thereby causing the first light-emitting device 130 to be in a light-emitting state.

With the above provision, the first transistors T1, the second transistors T2 and the storage capacitors Cst on the substrate 120 may be used to control the operating states of the plurality of first light-emitting devices 130, and the driving circuit 125 has a simple structure, which is beneficial to reducing the manufacturing difficulty of the substrate 120 and the backlight module 10.

Figure 7:
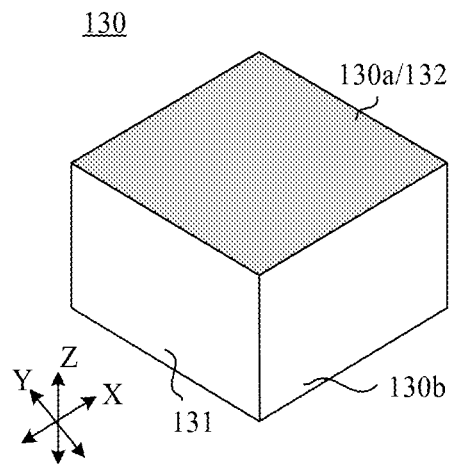
FIG. 7 is a structural diagram of a first light-emitting device, in accordance with some embodiments of the present disclosure.

In some embodiments, as shown in FIG. 7, the first light-emitting device 130 has a top surface 130a and a first side surface 130b surrounding the top surface 130a and connected to the top surface 130a.

For example, the first light-emitting device 130 may be in a shape of a column or substantially in a shape of a column.

For example, both the top surface 130a and the first side surface 130b of the first light-emitting device 130 may emit light.

In some examples, a light intensity of the light emitted from the top surface 130a of the first light-emitting device 130 is smaller than a light intensity of the light emitted from the first side surface 130b of the first light-emitting device 130. As a result, the light emitted by the first light-emitting device 130 may be scattered, which is conducive to the first light emitted by the first light-emitting device 130 passing through the light guide plate 110 and the prism sheet 150 to be the light of the first viewing angle. Therefore, the backlight of a relatively large angle may be provided for the display panel 20, so that the users may view the display image of the display panel 20 from a relatively large viewing angle.

Figure 8A:
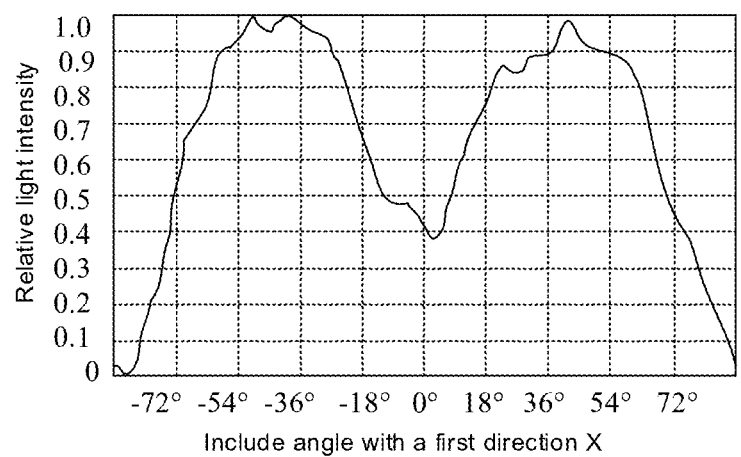
FIG. 8A is a graph showing a relationship between a relative light intensity of a light emitted by a first light-emitting device and an angle of the light, in accordance with some embodiments of the present disclosure.
Figure 8B:
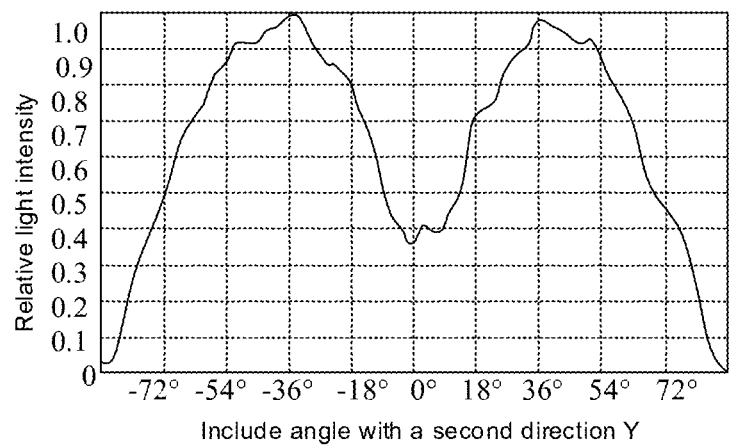
FIG. 8B is a graph showing a relationship between a relative light intensity of a light emitted by another first light-emitting device and an angle of the light, in accordance with some embodiments of the present disclosure.

FIG. 8A shows a relationship between an included angle between a direction of the light emitted by the first light-emitting device 130 and the first direction X and a relative light intensity of the light. FIG. 8B shows a relationship between an included angle between the direction of the light emitted by the first light-emitting device 130 and the second direction Y and a relative light intensity of the light.

As shown in FIG. 8A, in a case where the included angle between the direction of the light emitted by the first light-emitting device 130 and the first direction X is 0°, the relative light intensity of the light is small and about 0.4. In a case where the included angle between the direction of the light emitted by the first light-emitting device 130 and the first direction X is in a range of 30° to 60°, the relative light intensity of the light is large and the relative light intensity is greater than 0.7. As shown in FIG. 8B, in a case where the included angle between the direction of the light emitted by the first light-emitting device 130 and the second direction Y is 0°, the relative light intensity of the light is small and less than 0.4. In a case where the included angle between the direction of the light emitted by the first light-emitting device 130 and the second direction Y is in a range of 30° to 60°, the relative light intensity of the light is large and the relative light intensity is greater than 0.7. It can be seen that the light emitted by the first light-emitting device 130 is relatively scattered, and the light intensity of the light emitted from the top surface of the first light-emitting device 130 is smaller than the light intensity emitted from the first side surface of the first light-emitting device 130.

It can be understood that the first light-emitting device 130 has a varying type, which may be set according to actual needs and is not limited in the present disclosure.

In some examples, as shown in FIG. 7, the first light-emitting device 130 includes a first lamp bead 131 and a transflective film 132.

For example, the light lamp bead 131 includes a light-emitting diode (LED). For example, the LED may be a wide-angle LED, that is, the LED may emit light of a relatively large angle.

For example, the first lamp bead 131 may be a Lambertian LED.

For example, the first lamp bead 131 is an LED that contains fluorescent powders and emits white light.

For example, light beams of different angles emitted by the first lamp bead 131 have substantially the same light intensity.

For example, the transflective film 132 covers a top surface of the first lamp bead 131.

For example, the transflective film 132 may further be used as an encapsulation layer of the first lamp bead 131.

For example, the material of the transflective film 132 may include polycarbonate (PC).

For example, the transflective film 132 has a certain transmittance, and the transflective film 132 partially blocks the light emitted from the top surface of the first lamp bead 131, so that the light intensity of the light emitted from the top surface 130a of the first light-emitting device 130 is smaller than the light intensity of the light emitted from the first side surface 130b of the first light-emitting device 130.

Figure 9A:
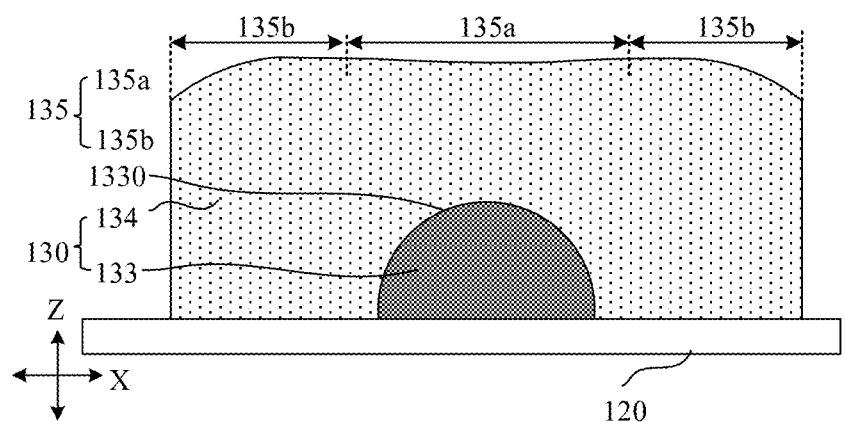
FIG. 9A is a structural diagram of yet another substrate and yet another first light-emitting device, in accordance with some embodiments of the present disclosure.

In some embodiments, as shown in FIG. 9A, the first light-emitting device 130 includes a second lamp bead 133 and a lens 134.

For example, the second lamp bead 133 may include a common LED.

For example, the lens 134 covers a top surface 133O of the second lamp bead 133. A surface of the lens 134 away from the substrate 120 is a smooth curved surface 135, and the smooth curved surface 135 includes a first portion 135A and a second portion 135B surrounding the first portion 135A. The first portion 135A is concave toward a direction approaching the substrate 120, and the second portion 135B is convex toward a direction away from the substrate 120.

For example, an orthographic projection of the second lamp bead 133 on the substrate 120 is within an orthographic projection of the lens 134 on the substrate 120.

For example, the first portion 135A is closer to a center of the second lamp bead 133 than the second portion 135B.

Figure 9B:
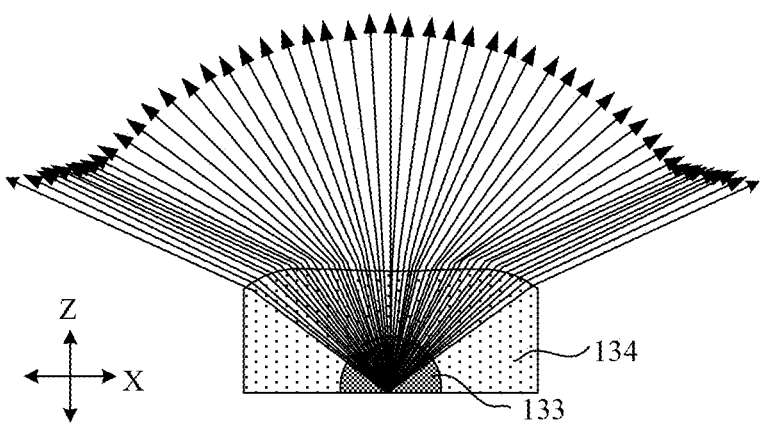
FIG. 9B is a schematic diagram of light emitted by a first light-emitting device, in accordance with some embodiments of the present disclosure.

For example, as shown in FIGS. 9A and 9B, broken lines each with an arrow in FIG. 9B represent optical paths of the light beams emitted by the second lamp bead 133. The light beams emitted by the second lamp bead 133 change little in exit angle after passing through the first portion 135A of the lens 134. The light beams emitted by the second lamp bead 133 undergo significant deflection at the second portion 135B after passing through the second portion 135B of the lens 134, so that the light beams emitted by the first light-emitting device 130 have large angles, and the light beams at the large angles have large light intensity. As a result, in a case where the first light-emitting device 130 is applied to the backlight module 10, light of the relatively large first viewing angle may be provided.

Figure 9C:
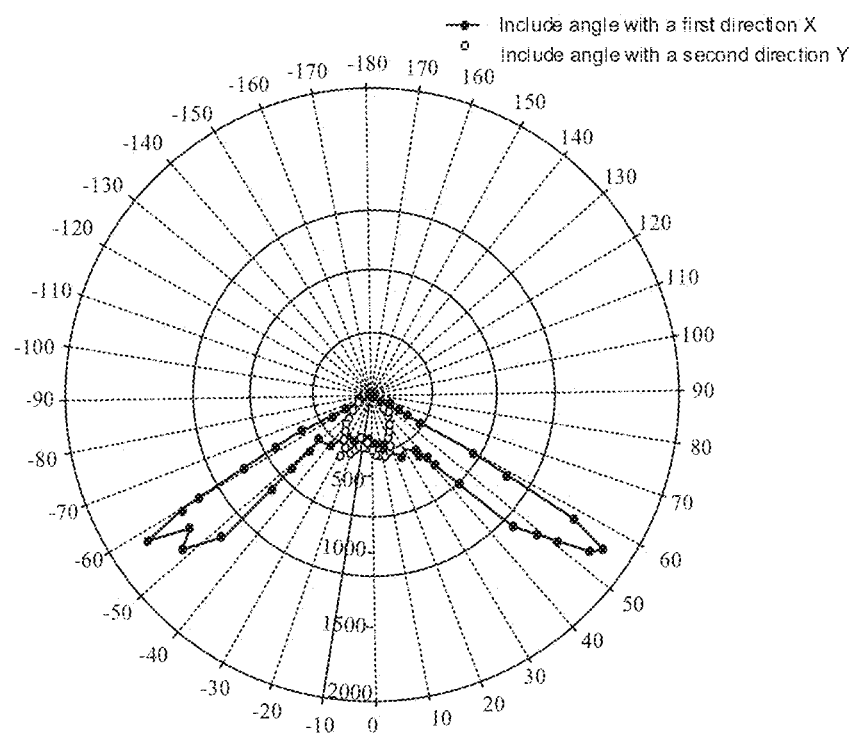
FIG. 9C is a graph showing a relationship between a light intensity of a light emitted by a first light-emitting device and an angle of the light, in accordance with some embodiments of the present disclosure.

FIG. 9C shows a relationship between a light intensity of the light emitted by the first light-emitting device 130 and a circumferential angle. It can be seen that in a case where an included angle between a direction of the light emitted by the first light-emitting device 130 and the first direction X is in a range of 30° to 60° (or in a range of −30° to) −60°, the light intensity of the light is relatively large. Therefore, the angles of the light emitted by the first light-emitting device 130 are relatively large, which is conducive to the light emitted by the first light-emitting device 130 becoming diffused light after passing through the light guide plate 110 and the prism sheet 150. Thus, the backlight of the relatively large angle may be provided for the display panel 20, so that the users may view the image displayed on the display apparatus 1 from a relatively large viewing angle.

It can be understood that the above light guide plate 110 has a varying structure, which may be selected according to actual conditions and is not limited in the present disclosure.

Figure 10:
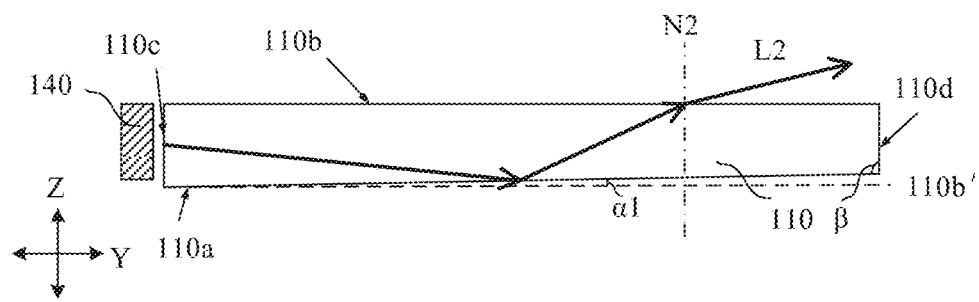
FIG. 10 is a structural diagram of a light guide plate and a second light-emitting device, in accordance with some embodiments of the present disclosure.

In some embodiments, as shown in FIG. 10, the light guide plate 110 further includes a second side surface 110d. The second side surface 110d connects the bottom surface 110a and the light exit surface 110b, and is opposite to the light incident surface 110c.

For example, as shown in FIG. 10, an included angle between the bottom surface 110a and the second side surface 110d is an obtuse angle β, and an included angle between the bottom surface 110a and the light exit surface 110b (or the reference surface 110b', which is a parallel surface of the light exit surface 110b, as a dotted line illustrated in FIG. 10) is a first acute angle α1.

The provision manner of the light guide plate 110 in the above embodiments may break the condition for total reflection of the second light L2 in the light guide plate 110, so that the second light L2 emitted by the second light-emitting device 140 has an increasing exit angle after passing through the light incident surface 110c and being reflected by the bottom surface 110a, and thus the second light L2 through the light exit surface 110b has a relatively large exit angle. As a result, the second light L2 exiting through the light guide plate 110 is scattered, and the exit angle of the second light L2 increases. Thus, the prism sheet 150 may modulate the second light L2 to become the light of the second viewing angle.

For example, as shown in FIG. 10, the exit angle of the second light L2 through the light exit surface 110b may be greater than or equal to 70°. The exit angle here refers to an included angle between a second light L2 and a normal line N2 of the light exit surface 110b. The prism sheet 150 may modulate the second light L2 exiting with an angle greater than or equal to 70°. The prism sheet 150 has little modulation effect on the light exiting from the light exit surface 110b with an angle less than 70°.

In some examples, the first acute angle α1 is in a range of 0.1° to 10°, inclusive.

For example, the first acute angle α1 may be 0.1°, 0.8°, 3.0°, 5.0°, 8.5°, or 10°.

With the above provision, after the second light L2 exits from the light guide plate 110, the second light L2 may be ensured to be modulated by the prism sheet 150, thereby ensuring that the second light L2 may be modulated into light of relatively small second viewing angle, and further ensuring that the backlight with relatively small viewing angle is provided for the display panel 20.

Figure 11:
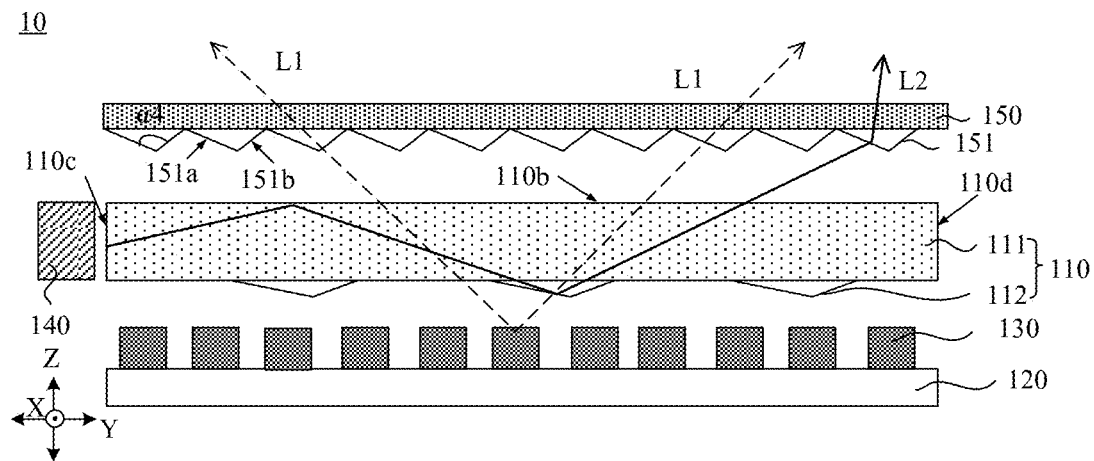
FIG. 11 is a structural diagram of another backlight module, in accordance with some embodiments of the present disclosure.

In some other embodiments, as shown in FIG. 11, the light guide plate 110 includes a light guide body 111 and a plurality of microstructures 112 located on the side of the light guide body 111 proximate to the substrate 120.

In some examples, the plurality of microstructures 112 are configured to increase the exit angle of the second light L2, so that the exit angle of the second light L2 reaches a preset exit angle range.

For example, the plurality of microstructures 112 may break the condition for total reflection of the second light L2 in the light guide plate 110, so that the second light L2 after passing through the microstructures 112 has an increasing exit angle.

For example, the preset exit angle range may be greater than or equal to 70°. The preset exit angle refers to an included angle between the light exit direction and the normal line N2 of the light exit surface 110b.

The provision of the plurality of microstructures 112 causes the light emitted by the second light-emitting device 140 to have an increasing exit angle after passing through the microstructures 112, and the exit angle reaches the preset exit angle range, so that the second light L2 may become the light of the second viewing angle under the modulation effect of the prism sheet 150. Further, the backlight module 10 may provide the light of the second viewing angle for the display panel 20, so that the users may view the image displayed on the display apparatus 1 from a relatively small viewing angle or a front viewing angle.

Figure 12A:
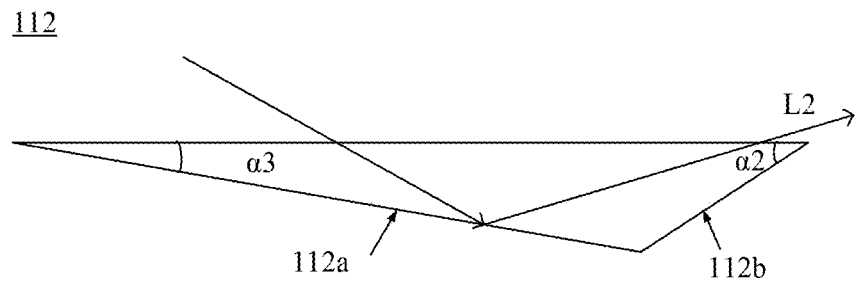
FIG. 12A is a structural diagram of microstructures from a perspective, in accordance with some embodiments of the present disclosure.

In some examples, as shown in FIG. 12A, the above microstructure 112 has a reflective surface 112a. The reflective surface 112a is configured to reflect the second light L2 incident on the reflective surface 112a.

For example, the reflective surface 112a and the light exit surface 110b may not be parallel, so that the second light has an increasing exit angle after being reflected by the reflective surface 112a, and the exit angle reaches the preset exit angle range.

Figure 12B:
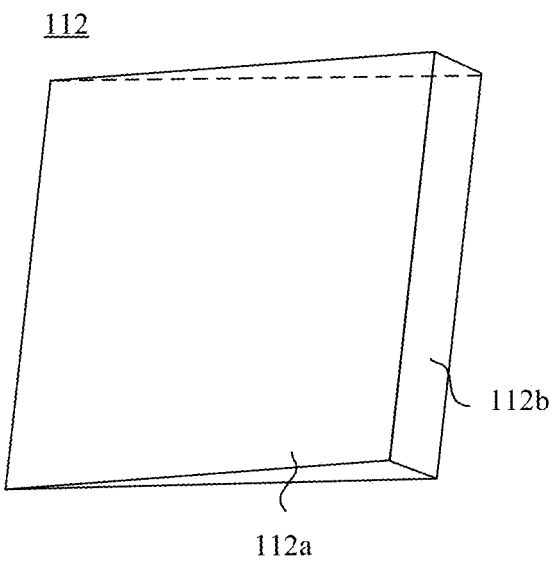
FIG. 12B is a structural diagram of microstructures from another perspective, in accordance with some embodiments of the present disclosure.

In some embodiments, as shown in FIGS. 12A and 12B, the microstructure 112 further has a third side surface 112b connected to the reflective surface 112a.

For example, an included angle between the third side surface 112b and the light exit surface 110b is a second acute angle α2, and an included angle between the reflective surface 112a and the light exit surface 110b is a third acute angle α3. The second acute angle α2 is greater than the third acute angle α3. An included angle between the third side surface 112b and the reflective surface 112a is an obtuse angle. The reflective surface 112a is closer to the second light-emitting device 140 than the third side surface 112b.

The above provision may cause the exit angle of the second light L2 emitted by the second light-emitting device 140 to be slightly adjusted at the reflective surface 112a of the microstructure 112, so that an exit angle of the second light L2 after passing through the microstructure 112 increases to reach the preset exit angle range.

In some examples, the third acute angle α3 is in a range of 0.1° to 10.0°, inclusive.

For example, the third acute angle α3 may be 0.1°, 0.7°, 1.6°, 3.0°, 7.5°, or 10.0°.

The setting of the above angle range of the third acute angle α3 may ensure that after the second light emitted by the second light-emitting device 140 exits through the microstructures 112, the exit angle of the second light may be adjusted by the microstructures 112 to be within the preset exit angle range, thereby ensuring that the second light can be modulated by the prism sheet 150 into the light of the second viewing angle.

Figure 13:
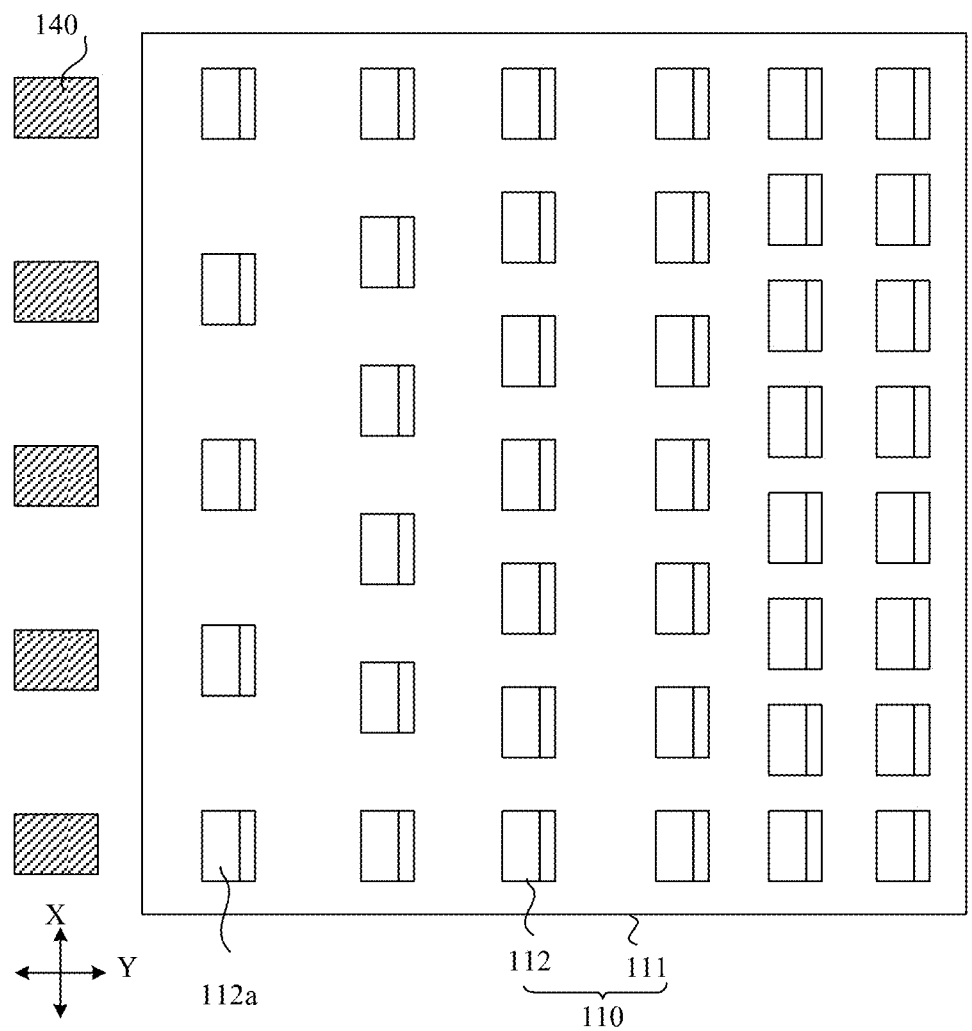
FIG. 13 is a structural diagram of a light guide plate and a second light-emitting device, in accordance with some embodiments of the present disclosure.

In some embodiments, as shown in FIG. 13, the plurality of microstructures 112 are arranged in an array.

For example, the plurality of microstructures 112 are arranged in multiple columns, and microstructures 112 in each column are arranged in the first direction X. The above provision may make the arrangement of the plurality of microstructures 112 relatively regular.

Figure 14:
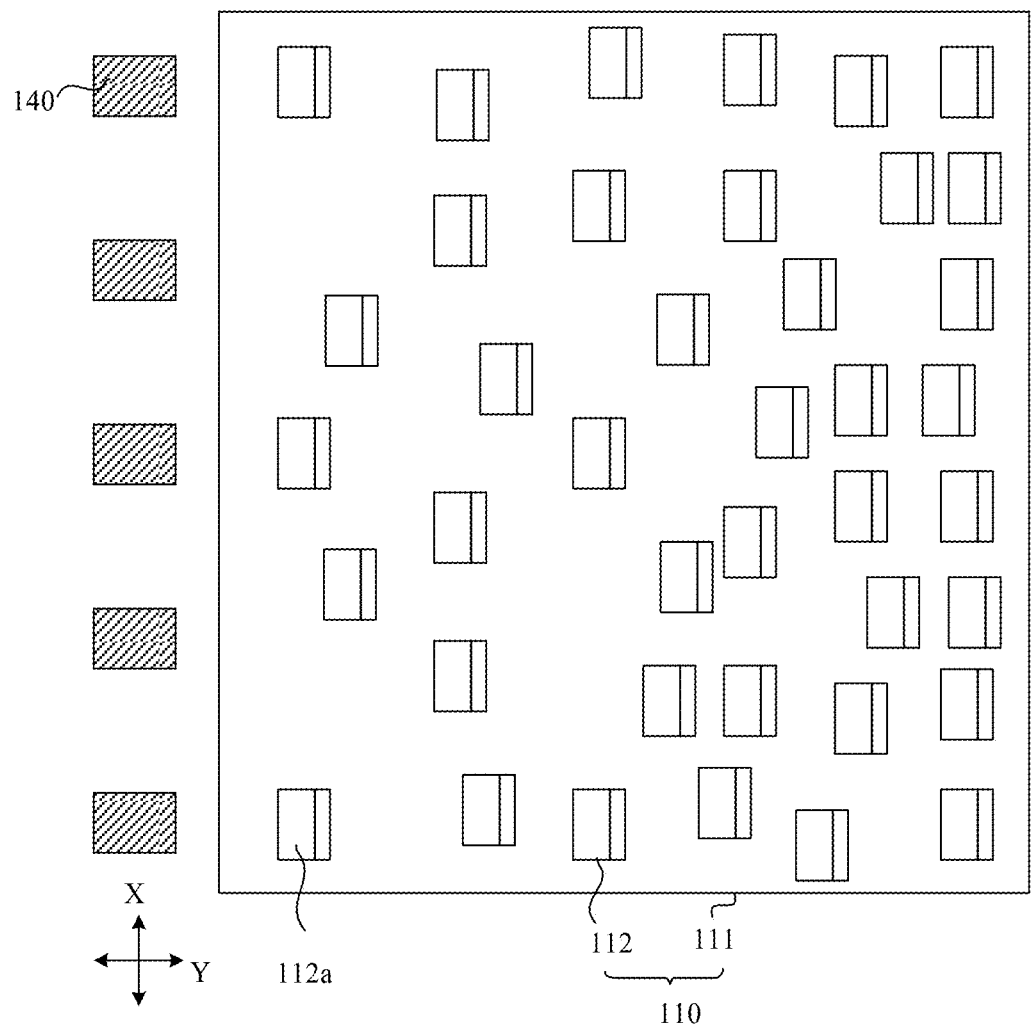
FIG. 14 is a structural diagram of another light guide plate and another second light-emitting device, in accordance with some embodiments of the present disclosure.

In some examples, as shown in FIG. 14, the plurality of microstructures 112 are arranged randomly.

In some embodiments, as shown in FIGS. 13 and 14, a sum of areas of reflective surfaces 112a of multiple microstructures 112 is positively correlated with a distance between the multiple microstructures 112 and the plurality of second light-emitting devices 140.

For example, considering the plurality of microstructures 112 arranged in an array as an example, the greater a sum of areas of reflective surfaces 112a of microstructures 112 in a column, the larger a distance between the microstructures 112 in the column and the plurality of second light-emitting devices 140. On the contrary, the less a sum of areas of reflective surfaces 112a of microstructures 112 in a column, the smaller a distance between the microstructures 112 in the column and the plurality of second light-emitting devices 140.

For example, the areas of the reflective surfaces 112a of the plurality of microstructures 112 may be equal, or the areas of the reflective surfaces 112a of the plurality of microstructures 112 may be unequal.

It can be understood that the larger the distance between the microstructure 112 and the second light-emitting devices 140, the greater the loss of light emitted by the second light-emitting devices 140 during propagation, and the less the amount of light emitted by the second light-emitting devices 140 that can be received by the microstructure.

With the above provision, the amounts of light reflected by the plurality of microstructures 112 with different distances from the second light-emitting devices 140 may be adjusted, so as to ensure that the plurality of microstructures 112 with different distances from the second light-emitting devices 140 or the plurality of microstructures located at different positions of the substrate 120 may receive substantially the same total amount of the second light L2, and thus the amount of the backlight of the second viewing angle provided by different regions of the backlight module 10 may be adjusted. As a result, the uniformity of the backlight of the second viewing angle provided by different regions of the backlight module 10 may be improved, and further the display uniformity of the display apparatus 1 may be improved. Therefore, it may be avoided that the microstructures 112 farther away from the second light-emitting devices 140 reflect less second light L2, the region of the backlight module 10 farther away from the second light-emitting devices 140 provides less amount of backlight of the second viewing angle, and the backlight module 10 provides uneven backlight of the second viewing angle.

Figure 15:
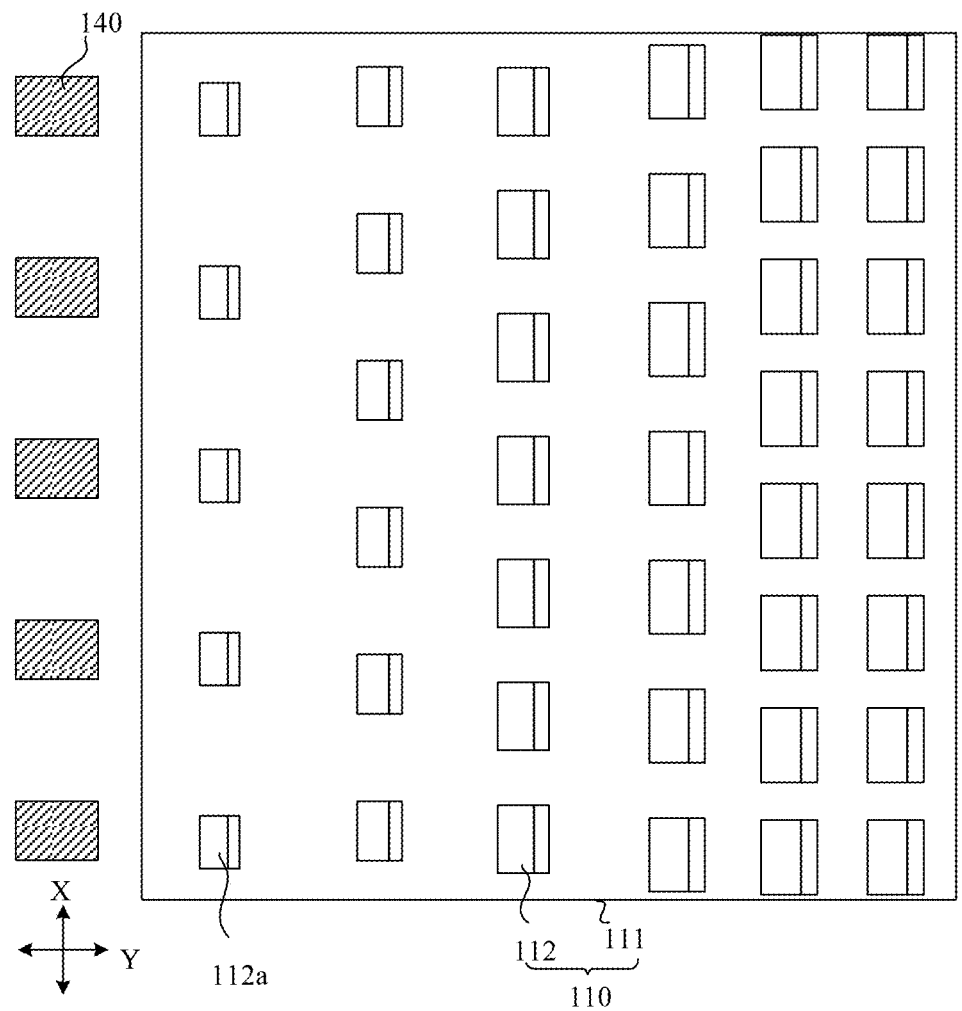
FIG. 15 is a structural diagram of yet another light guide plate and yet another second light-emitting device, in accordance with some embodiments of the present disclosure.

In some embodiments, as shown in FIG. 15, an area of a reflective surface 112a of a microstructure 112 is positively correlated with a distance between the microstructure 112 and the plurality of second light-emitting devices 140.

For example, the larger an area of a reflective surface 112a of a single microstructure 112, the larger a distance between the microstructure 112 and the plurality of second light-emitting devices 140. On the contrary, the smaller the area of the reflective surface 112a of a single microstructure 112, the smaller the distance between the microstructure 112 and the plurality of second light-emitting devices 140.

It can be understood that the larger the area of the reflective surface 112a of the microstructure 112, the greater the amount of light emitted by the second light-emitting devices 140 that can be reflected by the microstructure 112.

With the above provision, the amounts of light reflected by the microstructures 112 with different distances from the second light-emitting devices 140 may be adjusted, so that a sum of areas of reflective surfaces of microstructures 112 farther away from the second light-emitting devices 140 may be relatively large, so as to ensure that the microstructures 112 with different distances from the second light-emitting devices 140 or the microstructures located at different positions of the substrate 120 may receive substantially the same total amount of the second light L2, and thus the amount of the backlight of the second viewing angle provided by different regions of the backlight module 10 may be adjusted. As a result, the uniformity of the backlight of the second viewing angle provided by different regions of the backlight module 10 may be improved, and further the display uniformity of the display apparatus 1 may be improved. Therefore, it may be avoided that the microstructures 112 farther away from the second light-emitting devices 140 reflect less second light L2, the region of the backlight module 10 farther away from the second light-emitting devices 140 provides less amount of backlight of the second viewing angle, and the backlight module 10 provides uneven backlight of the second viewing angle.

In some embodiments, as shown in FIGS. 13 to 15, an arrangement density of multiple microstructures 112 is positively correlated with a distance between the multiple microstructures 112 and the plurality of second light-emitting devices 140.

For example, the greater the arrangement density of the multiple microstructures 112, the greater the distance between the multiple microstructures 112 and the plurality of second light-emitting devices 140. On the contrary, the smaller the arrangement density of the multiple microstructures 112, the smaller the distance between the multiple microstructures 112 and the plurality of second light-emitting devices 140.

It can be understood that, considering an example where the reflective surfaces of the plurality of microstructures 112 have the same areas and the plurality of microstructures 112 are arranged in an array (as shown in FIG. 13), the greater the distance between microstructures 112 in a column and the second light-emitting devices 140, the greater the arrangement density of the microstructures 112 in the column, the larger the sum of the areas of the reflective surfaces of the multiple microstructures in the microstructures 112 in the column, and the greater the amount of light emitted by the second light-emitting devices 140 that can be reflected by the microstructures 112 in the column. Therefore, the loss of the amount of light caused by the long propagation distance of the second light-emitting devices 140 may be adjusted.

With the above provision, the amount of light reflected by the microstructures 112 with different distances from the second light-emitting devices 140 may be adjusted, so that the sum of the areas of the reflective surfaces of the microstructures 112 farther from the second light-emitting devices 140 may be relatively large, so as to ensure that the microstructures 112 with different distances from the second light-emitting devices 140 or the microstructures located at different positions of the substrate 120 may receive substantially the same total amount of the second light L2, and thus the amount of the backlight of the second viewing angle provided by different regions of the backlight module 10 may be adjusted. As a result, the uniformity of the backlight of the second viewing angle provided by different regions of the backlight module 10 may be improved, and further the display uniformity of the display apparatus 1 may be improved. Therefore, it may be avoided that the microstructures 112 farther away from the second light-emitting devices 140 reflect less second light L2, the region of the backlight module 10 farther away from the second light-emitting devices 140 provides less amount of backlight of the second viewing angle, and the backlight module 10 provides uneven backlight of the second viewing angle.

Figure 16A:
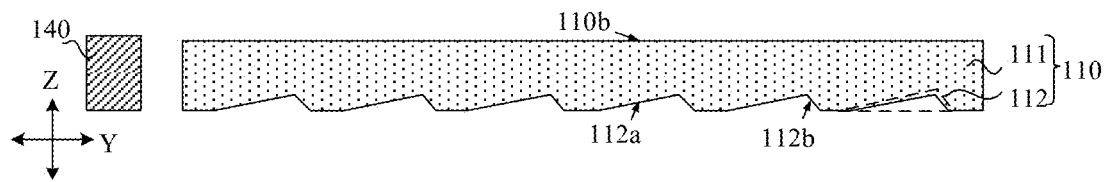
FIG. 16A is a structural diagram of yet another light guide plate and yet another second light-emitting device, in accordance with some embodiments of the present disclosure.

In some embodiments, as shown in FIG. 16A, the reflective surface 112*a* and the third side surface 112*b* of each of the plurality of microstructures 112 are concave toward a direction approaching the light exit surface 110*b*.

With the above provision, the second light emitted by the second light-emitting device 140 may be reflected on the reflective surface 112*a*, and the exit angle of the second light L2 may increase, so that the prism sheet 150 may modulate the second light L2 to be the light of the second viewing angle. Further, the backlight module 10 may provide the light of the second viewing angle for the display panel 20, so that the users may view the image displayed on the display apparatus 1 from a relatively small viewing angle or a front viewing angle.

Figure 16B:
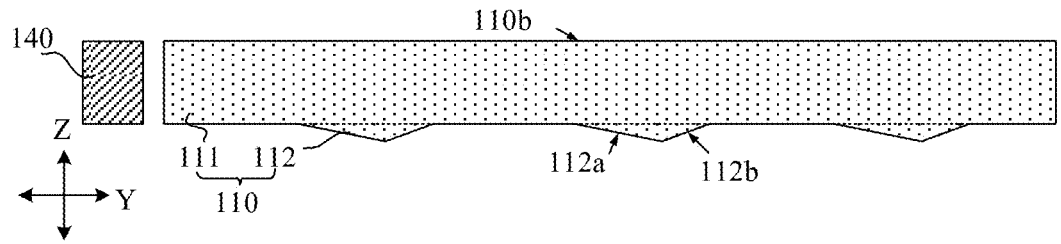
FIG. 16B is a structural diagram of yet another light guide plate and yet another second light-emitting device, in accordance with some embodiments of the present disclosure.

In some embodiments, as shown in FIG. 16B, the reflective surface 112*a* and the third side surface 112*b* of each of the plurality of microstructures 112 are convex toward a direction away from the light exit surface 110*b*.

With the above provision, the second light emitted by the second light-emitting device 140 may be reflected on the reflective surface 112*a*, and the exit angle of the second light L2 may increase, so that the prism sheet 150 may modulate the second light L2 to be the light of the second viewing angle. Further, the backlight module 10 may provide the light of the second viewing angle for the display panel 20, so that the users may view the image displayed on the display apparatus 1 from a relatively small viewing angle or a front viewing angle.

In some embodiments, as shown in FIG. 16B, the plurality of microstructures 112 and the light guide body 111 have an integrated structure.

With the above provision, the manufacturing process of the light guide plate 110 may be simplified, thereby simplifying the manufacturing process of the backlight module 10.

Figure 17:
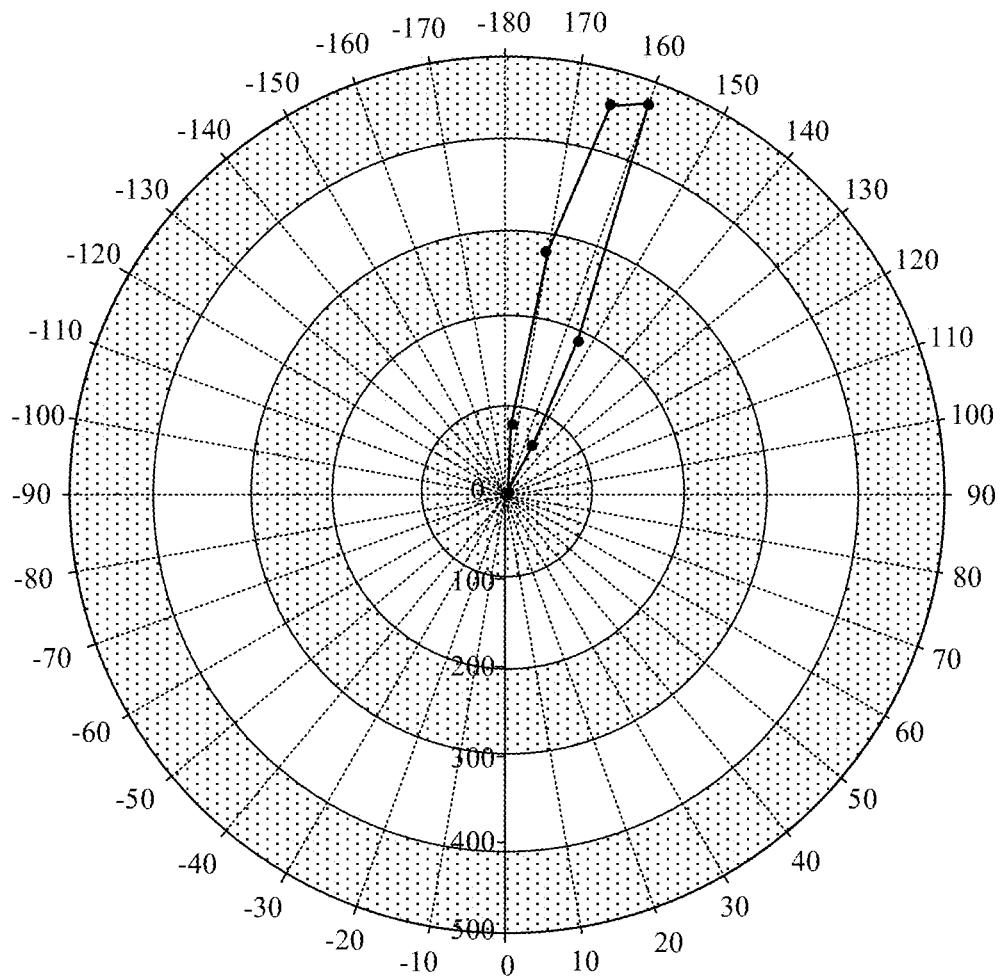
FIG. 17 is a graph showing a relationship between a light intensity of a second light exiting from a light guide plate and an angle of the light, in accordance with some embodiments of the present disclosure.

FIG. 17 shows a relationship between the exit angle of the second light L2 emitted by the second light-emitting device 140 after exiting through the light guide plate 110 and corresponding light intensity. In FIGS. 17, 0 to 170 and 0 to −180 represent an included angle between the exit direction of the second light L2 after passing through the light guide plate 110 and the light exit surface 110*b* of the light guide plate 110 (e.g., in FIG. 17, 160 indicates that the included angle between the exit direction of the second light and the light exit surface of the light guide plate is 160°, and the second light exits toward a side where the display panel is located; and −110 indicates that the included angle between the exit direction of the second light and the light exit surface of the light guide plate is −110°, and the second light exits toward a side where the substrate is located), and 0, 100, 200, 300 and 400 represent the light intensity. It can be seen that in a case where the included angle between the second light L2 and the light exit surface 110*b* is in a range of 150° to 170°, the second light L2 has relatively large light intensity, while in other angle ranges, almost no light exits. Therefore, the exit angle of the second light L2 emitted by the second light-emitting device 140 after passing through the light guide plate 110 increases, so that the second light L2 becomes diffused light, which is conducive to the second light L2 reaching the preset exit angle range. As a result, the second light L2 may become the light of the second viewing angle due to action of modulation by the prism sheet 150 to exit, so that the backlight module 10 may provide the light of the second viewing angle for the display panel 20, and thus the users may view the image displayed on the display apparatus 1 from a relatively small viewing angle or a front viewing angle.

Figure 18A:
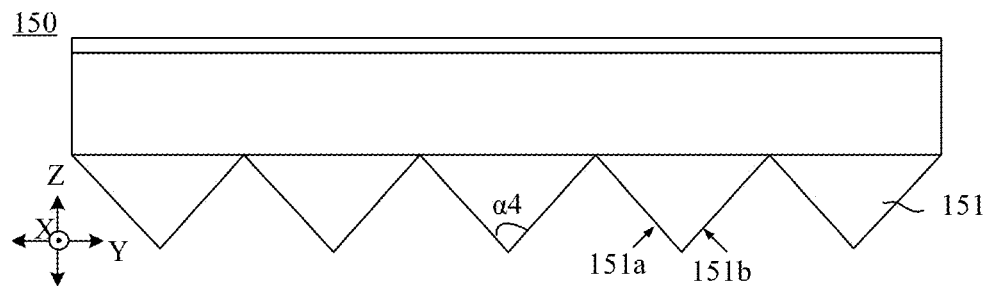
FIG. 18A is a structural diagram of a prismatic lens, in accordance with some embodiments of the present disclosure.

In some embodiments, as shown in FIGS. 11 and 18A, the prism sheet 150 includes a plurality of protrusions 151. The plurality of protrusions 151 are located on a side of the prism sheet 150 proximate to the light guide plate 110, and the plurality of protrusions 151 are configured to make the light passing through the plurality of protrusions 151 converge.

For example, the prism sheet 150 may also be called an inverse prism film.

For example, the exit angle of the second light L2 emitted by the second light-emitting devices 140, after passing through the light guide plate 110, increases. Then, the second light L2 is refracted at the plurality of protrusions 151, so that the exiting second light L2 after passing through the plurality of protrusions 151 converges and the exit angle decreases. Thus, the backlight module may provide the light of the second viewing angle for the display panel 20, so that the users may view the image displayed on the display apparatus 1 from a relatively small viewing angle or a front viewing angle.

Figure 19:
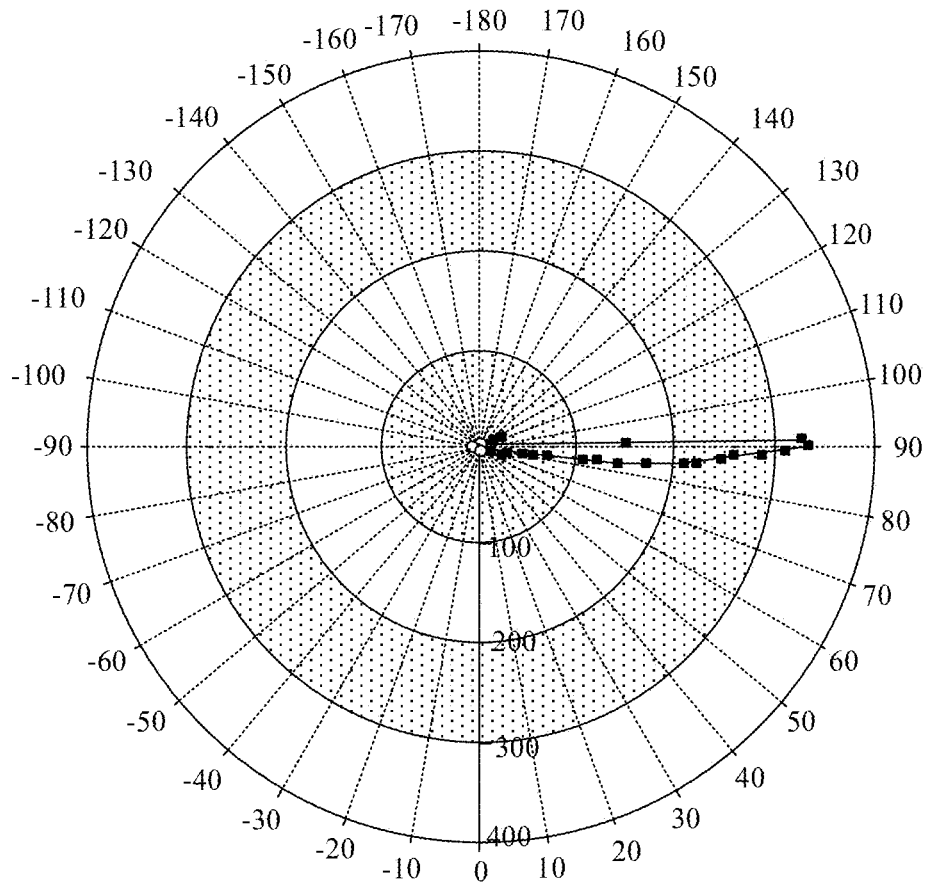
FIG. 19 is a graph showing a relationship between a light intensity of a second light exiting from a prism sheet and an angle of the light, in accordance with some embodiments of the present disclosure.

FIG. 19 shows a relationship between the exit angle of the second light L2 emitted by the second light-emitting device 140 after exiting through the prism sheet 150 and corresponding light intensity. In FIGS. 19, 0 to 170 and 0 to −180 represent an included angle between the exit direction of the second light L2 and a plane where the prism sheet 150 is located (e.g., 160 in FIG. 19 indicates that the included angle between the exit direction of the second light L2 and the plane where the prism sheet is located is 160°, and the second light L2 exits toward a side where the display panel is located; and −110 in FIG. 19 indicates that the included angle between the exit direction of the second light L2 and the plane where the prism sheet is located is −110°, and the second light exits toward a side where the light guide plate is located), and 0, 100, 200, 300 and 400 represent the light intensity. It can be seen that in a case where the included angle between the second light L2 and the plane where the prism sheet 150 is located is in a range of 80° to 95°, the second light L2 has relatively large light intensity, while in other angle ranges, almost no light exits. Therefore, the second light L2 emitted by the second light-emitting devices 140 converges after passing through the plurality of protrusions 151, and the light exiting after passing through the plurality of protrusions 151 becomes the light of the second viewing angle. As a result, the backlight module 10 may provide the light of the second viewing angle for the display panel 20, and thus the users may view the image displayed on the display apparatus 1 from a relatively small viewing angle or a front viewing angle.

Figure 18B:
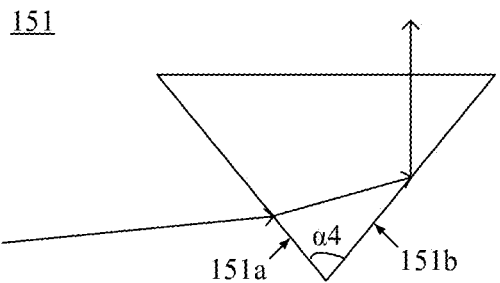
FIG. 18B is a structural diagram of a protrusion, in accordance with some embodiments of the present disclosure.

In some embodiments, as shown in FIGS. 11, 18A and 18B, the protrusion 151 includes a fourth side surface 151A and a fifth side surface 151B connected to the fourth side surface 151A. The fourth side surface 151A is closer to the second light-emitting devices 140 than the fifth side surface 151B. An included angle between the fourth side surface 151A and the fifth side surface 151B is a fourth acute angle $\alpha 4$.

In some examples, the fourth acute angle $\alpha 4$ is in a range of 50° to 70°, inclusive.

For example, the fourth acute angle a4 may be 50°, 57°, 62°, 65°, 68°, or 70°.

The setting of the above angle range of the fourth acute angle a4 may ensure that the second light L2 emitted by the second light-emitting device 140 can be refracted at the fourth side surface 151A of the protrusion 151 of the prism sheet 150, so that the second light L2 exiting after passing through the plurality of protrusions 151 converges, and thus the refracted light becomes the light of the relatively small second viewing angle. As a result, the backlight module 10 may provide the light of the second viewing angle for the display panel 20, so that the users may view the image displayed on the display apparatus 1 from a relatively small viewing angle or a front viewing angle.

In some embodiments, as shown in FIGS. 11 and 18A, the plurality of protrusions 151 extend in the first direction X.

For example, the plurality of protrusions 151 are arranged in the second direction Y, and two adjacent protrusions 151 are in contact with each other.

For example, in a thickness direction Z of the substrate 120 and in the second direction Y, a cross-sectional shape of the protrusion 151 is a triangle.

For example, the first direction X is parallel to the arrangement direction of the plurality of second light-emitting devices 140. Therefore, the extension direction of the plurality of protrusions 151 is the same as the arrangement direction of the plurality of second light-emitting devices 140, so that almost all of the light emitted by the plurality of second light-emitting devices 140 can be incident on the corresponding plurality of protrusions 151, and thus the prism sheet 150 may modulate the second light, thereby improving the light efficiency of the backlight module and providing the display panel with more light of the second viewing angle.

In some examples, as shown in FIG. 4, the backlight module 10 further includes a reflective layer 160.

For example, the reflective layer 160 may be located on a side of the substrate 120 proximate to the light guide plate 110.

For example, the reflective layer 160 may be composed of reflective sheet(s), and the reflective sheet(s) are directly attached to the substrate 120.

For example, a material of the reflective layer 160 may be white ink.

For example, the white ink may be coated on the substrate 120 by using a coating process to form the reflective layer 160. The white ink has high reflectivity, and the reflective layer 160 made of the white ink has a high reflectivity. Therefore, the intensity of light exiting from the backlight module 10 may increase.

For example, the reflective layer 160 may reflect the light emitted by the first light-emitting devices 130, thereby increasing the intensity of light exiting from the backlight module 10.

For example, the reflective layer 160 may include a plurality of openings 161.

For example, the plurality of first light-emitting devices 130 may be located within the plurality of openings 161. A light-emitting device 130 is located within an opening 161. The opening 161 exposes the corresponding first light-emitting device 130 to be on the reflective layer 160, thereby avoiding the reflective layer 160 blocking the light emitted by the first light-emitting devices 130.

For example, in a case where the substrate 120 includes a plurality of chips, the plurality of chips may all be covered by the reflective layer 160. Of course, some of the chips may also be exposed by openings 161 of the reflective layer 160.

Figure 20A:
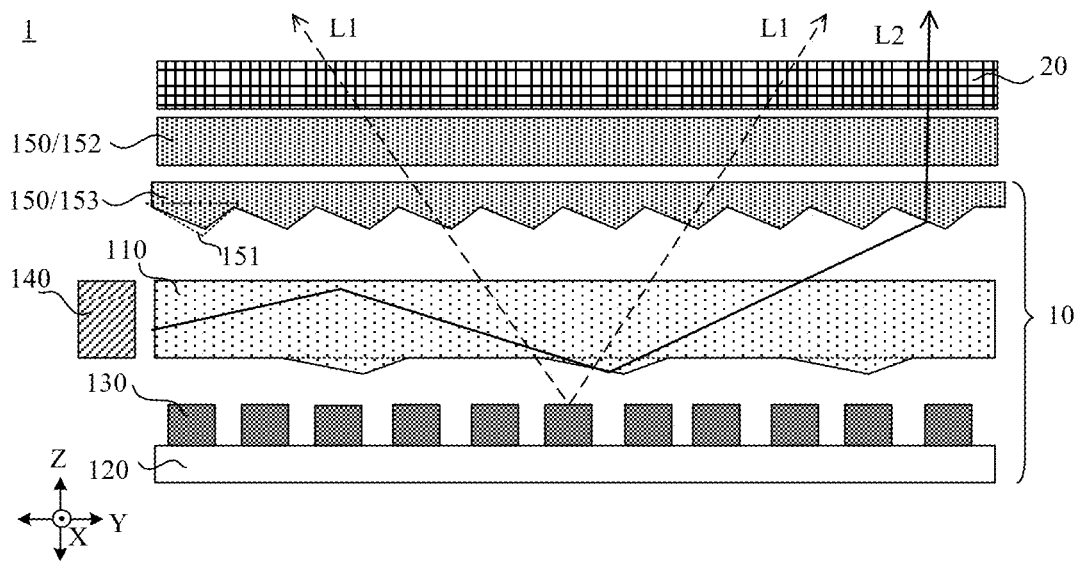
FIG. 20A is a structural diagram of yet another display apparatus from a perspective, in accordance with some embodiments of the present disclosure.
Figure 20B:
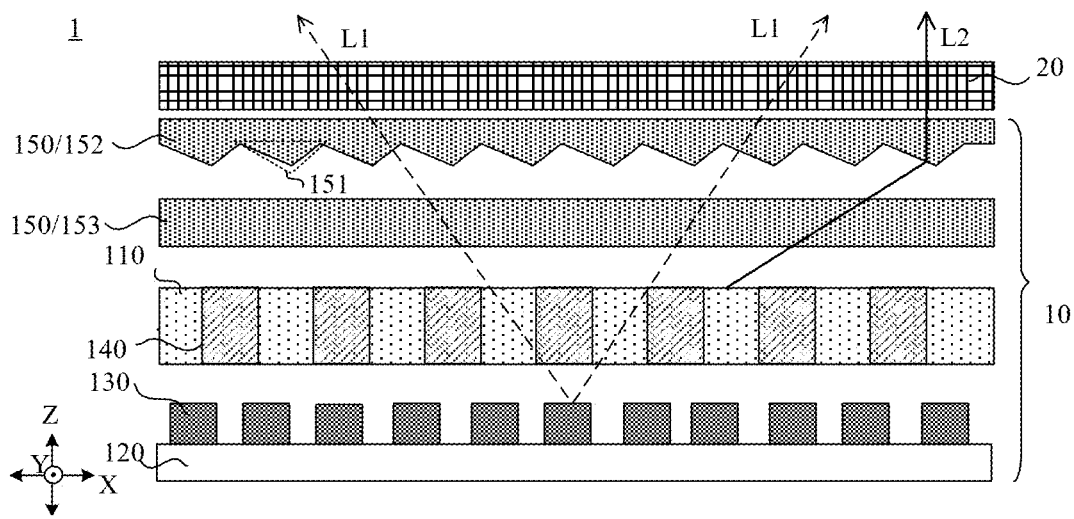
FIG. 20B is a structural diagram of yet another display apparatus from another perspective, in accordance with some embodiments of the present disclosure.

In some embodiments, as shown in FIGS. 20A and 20B, the number of the prism sheets 150 included in the backlight module 10 may be two. For example, a prism sheet located on a side of the display panel 20 proximate to the light guide plate 110 may be a first prism sheet 152, and a prism sheet located on a side of the light guide plate 110 proximate to the first prism sheet 152 may be a second prism sheet 153.

For example, the first prism sheet 152 and the second prism sheet 153 may have the same structures. As for structure features of the first prism sheet 152 and the second prism sheet 153, reference may be made to the description in above embodiments, and details are not provided herein again.

In some examples, extending directions of a plurality of protrusions of the first prism sheet 152 are different from extending directions of a plurality of protrusions of the second prism sheet 153.

For example, in combination with FIGS. 20A and 20B, the plurality of protrusions 151 of the first prism sheet 152 may extend in the second direction Y, and the plurality of protrusions 151 of the second prism sheet 153 may extend in the first direction X.

Therefore, among the second light L2 emitted by the second light-emitting devices 140, the light that has an included angle with the first direction X after exiting from the light guide plate 110 (referring to FIG. 20B) may become the light of the second viewing angle due to the action of modulation by the first prism sheet 152, so that the backlight module 10 provides the backlight of a relatively small viewing angle in the first direction X. Moreover, among the second light L2 emitted by the second light-emitting devices 140, the light that has an included angle with the second direction Y after exiting from the light guide plate 110 (referring to FIG. 20A) may become the light of the second viewing angle due to the action of modulation by the second prism sheet 153, so that the backlight module 10 provides the backlight of a relatively small viewing angle in the second direction Y. Therefore, the backlight module 10 having both the first prism sheet 152 and the second prism sheet 153 may provide the backlight of the relatively small viewing angle in both the first direction X and the second direction Y. In a case where the backlight module 10 is applied to a display apparatus or an anti-peep display apparatus, the backlight module 10 is combined with the display panel 20, so that the users may view the image displayed on the display apparatus from a relatively small viewing angle or a front viewing angle in both the first direction X (the first direction X may be a left and right direction of the display apparatus) and the second direction Y (the second direction Y may be an up and down direction of the display apparatus). Combined with the control of the operating states of the second light-emitting devices, a rather accurate local anti-peep function may be achieved.

The display apparatus 1 provided in the above embodiments of the present disclosure may realize the anti-peep function. Therefore, the above display apparatus 1 may further be used as an anti-peep display apparatus 2, as shown in FIG. 1C. FIG. 1C shows a case that from a side viewing angle (or a relatively large viewing angle), the users cannot view the image displayed on a central region of the anti-peep display apparatus 2, but may view the image displayed on other regions.

The anti-peep display apparatus 2 includes the backlight module 10 and the display panel 20 described in the above embodiments.

Beneficial effects that can be realized by the anti-peep display apparatus 2 are the same as beneficial effects that can be realized by the above display substrate 1, and details are not repeated here.

In some embodiments, the display state of the anti-peep display apparatus 2 includes a sharing state, a fully anti-peep state, and a local anti-peep state.

As for the sharing state, the fully anti-peep state, and the local anti-peep state, reference may be made to the descriptions in some of the above embodiments of the present disclosure, and details are not repeated here.

In some examples, the plurality of first light-emitting devices 130 and the plurality of second light-emitting devices 140 are configured such that the plurality of first light-emitting devices 130 are in light-emitting states and the plurality of second light-emitting devices 140 are in light-emitting states, so as to make the display state of the anti-peep display apparatus 2 in the sharing state.

Figure 21A:
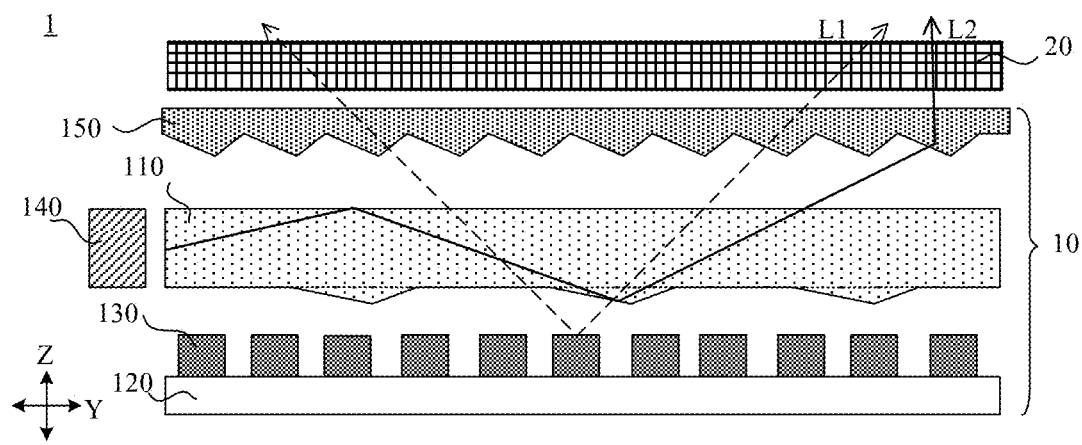
FIG. 21A is a structural diagram of a display apparatus in a sharing state, in accordance with some embodiments of the present disclosure.

For example, as shown in FIG. 21A, in a display mode of the sharing state, the substrate 120 controls the plurality of first light-emitting devices 130 to be all in the light-emitting states, and the first light L1 emitted by the first light-emitting devices 130 is the light of the first viewing angle. The light of the first viewing angle may provide the display panel 20 with backlight of the large viewing angle, so that the users may view the image displayed on the anti-peep display apparatus 2 from a relatively large viewing angle (such as side view). The plurality of second light-emitting devices 140 are all in the light-emitting states, and the second light L2 emitted by the second light-emitting devices 140 exits to be the light of the second viewing angle after passing through the light guide plate 110 and the prism sheet 150. The light of the second viewing angle may provide the display panel 20 with backlight of the small viewing angle, so that the users may view the image displayed on the anti-peep display apparatus 2 from a relatively small viewing angle (such as front view). As a result, multiple users may all view the image displayed on the anti-peep display apparatus 2 from different viewing angles.

Figure 21B:
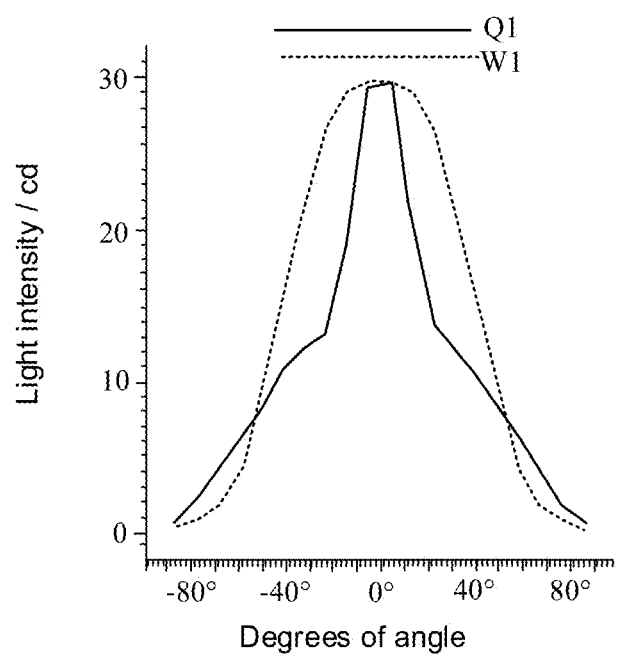
FIG. 21B is a graph showing a relationship between a backlight intensity and an angle of the light of the display apparatus shown in FIG. 21A.

The inventors conduct a simulation experiment on the backlight exiting from the backlight module 10 in the display mode of the sharing state and obtain FIG. 21B. FIG. 21B shows a relationship between the backlight of different angles provided by the backlight module 10 and corresponding light intensities in the sharing state. In FIG. 21B, Q1 refers to an included angle between the backlight provided by the backlight module 10 and a plane defined by the first direction X and the third direction Z, and W1 refers to an included angle between the backlight provided by the backlight module 10 and a plane defined by the second direction Y and the third direction Z. It can be seen that in a case where the included angle between the backlight provided by the backlight module 10 and the plane defined by the first direction X and the third direction Z is in a range of −80° to 80°, there is light with relatively great light intensity distributed, so that the users may view the display image almost from almost any viewing angle within the viewing angle range in the second direction Y; and in a case where the included angle between the backlight provided by the backlight module 10 and the plane defined by the second direction Y and the third direction Z is in a range of −80° to 80°, there is light with relatively great light intensity distributed, so that the users may view the display image almost from almost any viewing angle within the viewing angle range in the first direction X. Therefore, the users may all view the image displayed on the anti-peep display apparatus 2 from different viewing angles, thereby realizing sharing of the display image.

In some other examples, the plurality of first light-emitting devices 130 and the plurality of second light-emitting devices 140 are further configured such that the plurality of first light-emitting devices 130 are in non-light-emitting states and the plurality of second light-emitting devices 140 are in the light-emitting states, so as to make the display state of the anti-peep display apparatus 2 in the full anti-peep state.

Figure 22A:
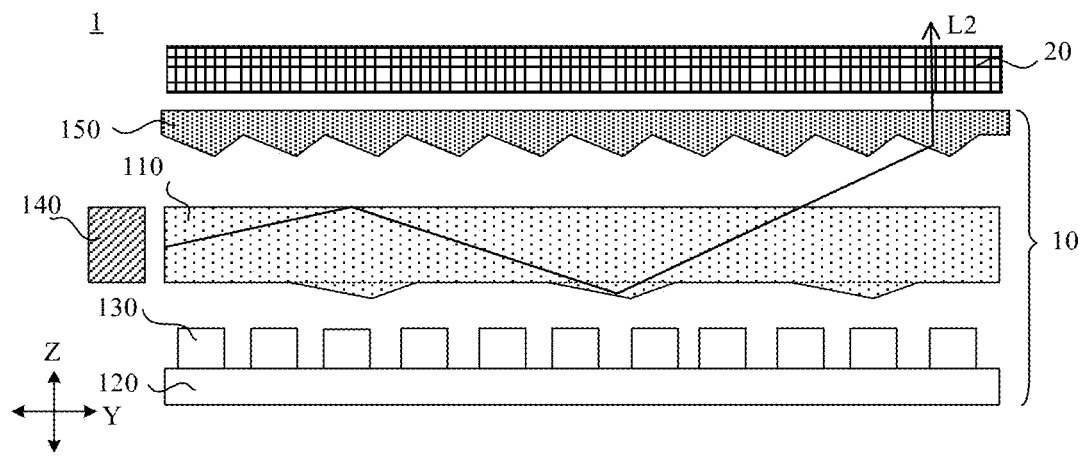
FIG. 22A is a structural diagram of a display apparatus in a fully anti-peep state, in accordance with some embodiments of the present disclosure.

For example, as shown in FIG. 22A, in a display mode of the fully anti-peep state, the substrate 120 controls the plurality of first light-emitting devices 130 to be in the non-light-emitting states, and then the backlight module 10 cannot provide the display panel 20 with the light of the first viewing angle, so that the users cannot view the image displayed on the anti-peep display apparatus from the relatively large viewing angle (such as side view). The plurality of second light-emitting devices 140 are all in the light-emitting states, and the second light L2 emitted by the second light-emitting devices 140 exits to be the light of the second viewing angle after passing through the light guide plate 110 and the prism sheet 150. The light of the second viewing angle may provide the display panel 20 with backlight of the small viewing angle, so that the users may view the image displayed on the anti-peep display apparatus 2 from a relatively small viewing angle (such as front view). As a result, the users may view the image displayed on the anti-peep display apparatus 2 only when front viewing.

Figure 22B:
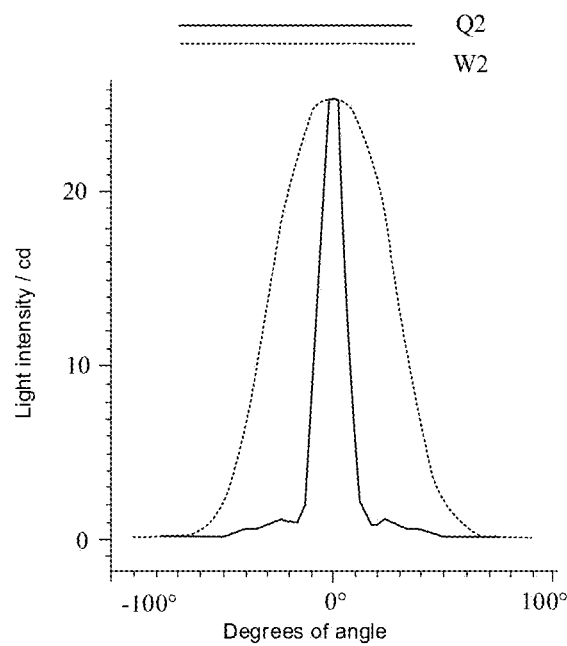
FIG. 22B is a graph showing a relationship between a backlight intensity and an angle of the light of the display apparatus shown in FIG. 22A.

The inventors conduct a simulation experiment on the backlight exiting from the backlight module 10 in the display mode of the fully anti-peep state and obtained FIG. 22B. FIG. 22B shows a relationship between the backlight of different angles provided by the backlight module 10 and corresponding light intensities in the fully anti-peep state. In FIG. 22B, Q2 refers to an included angle between the backlight provided by the backlight module 10 and a plane defined by the first direction X and the third direction Z, and W2 refers to an included angle between the backlight provided by the backlight module 10 and a plane defined by the second direction Y and the third direction Z. It can be seen that in a case where the included angle between a direction of the backlight provided by the backlight module 10 and the plane defined by the first direction X and the third direction Z is in a range of −30° to 30°, there is light with relatively great light intensity distributed, so that the users may view the display image only from a viewing angle within the above included angle range, thereby realizing the anti-peep function of the anti-peep display apparatus.

As shown in FIG. 22B, in the anti-peep display apparatus provided by the embodiments of the present disclosure, in the full anti-peep state, the anti-peep display apparatus may realize precise anti-peep within a 30° viewing angle (e.g., in a case where the user is at a position of 25° viewing angle of the anti-peep display apparatus. The light intensity of the backlight provided by the backlight module has been reduced to 10% of the light intensity from the front viewing angle), and the light intensity of the display image (or the brightness of the display image) viewed by the users from a viewing angle outside of the 30° viewing angle (as shown in FIG. 22B, within a viewing angle range of 30° to 100° and a viewing angle range of −30° to −100°) is less than or equal to 1% of the light intensity of the display image (or the brightness of the display image) viewed from a front viewing angle, and the users cannot view clearly or barely view the display image. Therefore, the anti-peep display apparatus of the present disclosure may reach an anti-peep angle of ±30°, thereby realizing the anti-peep function of the anti-peep display apparatus.

In yet other examples, the plurality of first light-emitting devices 130 and the plurality of second light-emitting devices 140 are further configured such that at least one first light-emitting device 130 is in a non-light-emitting state and the remaining first light-emitting devices 130 are in the light-emitting states, and the plurality of second light-emitting devices 140 are in the light-emitting states, so as to make the display state of the anti-peep display apparatus 2 in the local anti-peep state.

Figure 23A:
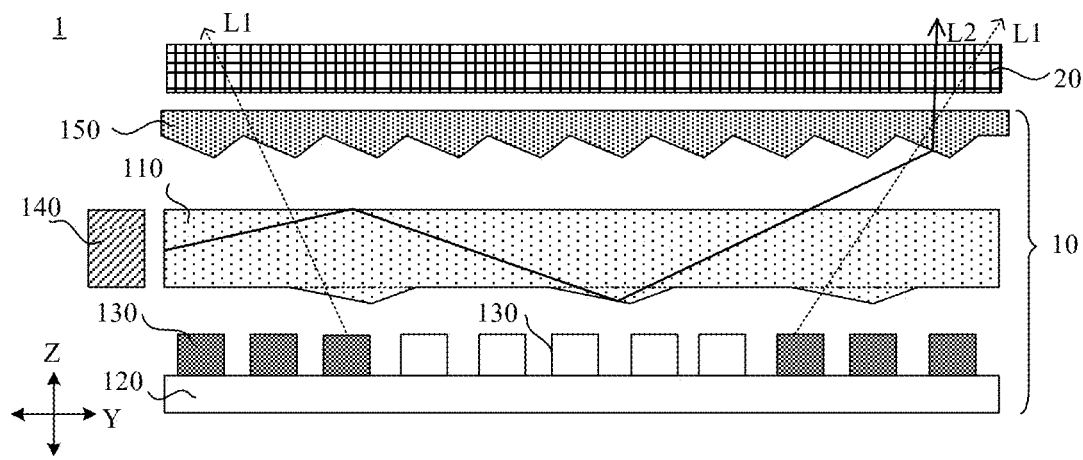
FIG. 23A is a structural diagram of a display apparatus in a local anti-peep state, in accordance with some embodiments of the present disclosure.

For example, as shown in FIG. 23A, in a display mode of the local anti-peep state, the substrate 120 controls multiple first light-emitting devices 130 corresponding to a first sub-region that needs anti-peep to be in the non-light-emitting states, while the remaining first light-emitting devices 130 to be in the non-light-emitting states. Then the first light-emitting devices 130 in the non-light-emitting states cannot provide a first region of the display panel 20 with the light of the first viewing angle, so that the users cannot view an image displayed on this region of the anti-peep display apparatus from a relatively large viewing angle (such as side view), thereby realizing local anti-peep of this region. The first light-emitting devices 130 in the light-emitting states may provide a corresponding region of the display panel 20 with the light of the first viewing angle, so that the users may view an image displayed on a display region other than the first region of the anti-peep display apparatus from a relatively large viewing angle (such as side view). Moreover, the plurality of second light-emitting devices 140 are all in the light-emitting states. The second light L2 emitted by the second light-emitting devices 140 exits to be the light of the second viewing angle after passing through the light guide plate 110 and the prism sheet 150. The light of the second viewing angle may provide the display panel 20 with backlight of the small viewing angle, so that the users may view the image displayed on the display apparatus from a relatively small viewing angle (such as front view). As a result, the users may view the display image of the entire region of the anti-peep display apparatus when front viewing, and cannot view the display image of the first region corresponding to the first light-emitting devices 130 in the non-light-emitting states from the relatively large viewing angle, thereby realizing dynamic anti-peep for any local region of the anti-peep display apparatus.

Figure 23B:
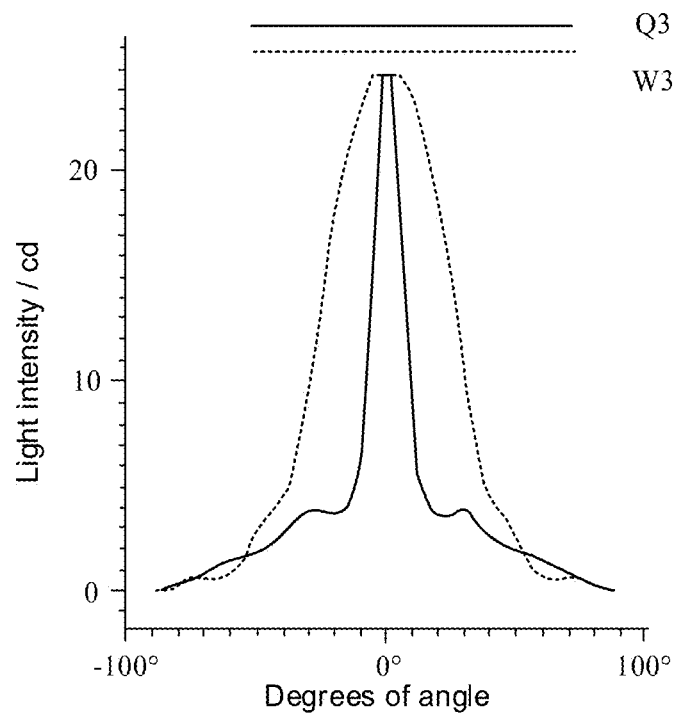
FIG. 23B is a graph showing a relationship between a backlight intensity and an angle of the light of the display apparatus shown in FIG. 23A.

The inventors conduct a simulation experiment on the backlight exiting from the backlight module 10 in the display mode of the local anti-peep state and obtained FIG. 23B. FIG. 23B shows a relationship between the backlight of different angles provided by the first sub-region of the backlight module 10 and corresponding light intensities in the local anti-peep state. In FIG. 23B, Q3 refers to an included angle between the backlight provided by the first sub-region of the backlight module 10 and a plane defined by the first direction X and the third direction Z, and W3 refers to an included angle between the backlight provided by the first sub-region of the backlight module 10 and a plane defined by the second direction Y and the third direction Z. It can be seen that in a case where the included angle between a direction of the backlight provided by the first sub-region of the backlight module 10 and the plane defined by the first direction X and the third direction Z is in a small range, there is light with relatively great light intensity distributed, so that the users may view the display image of the first region only from a viewing angle within the included angle range, thereby realizing dynamic anti-peep for any local region of the anti-peep display apparatus.

Figure 24:
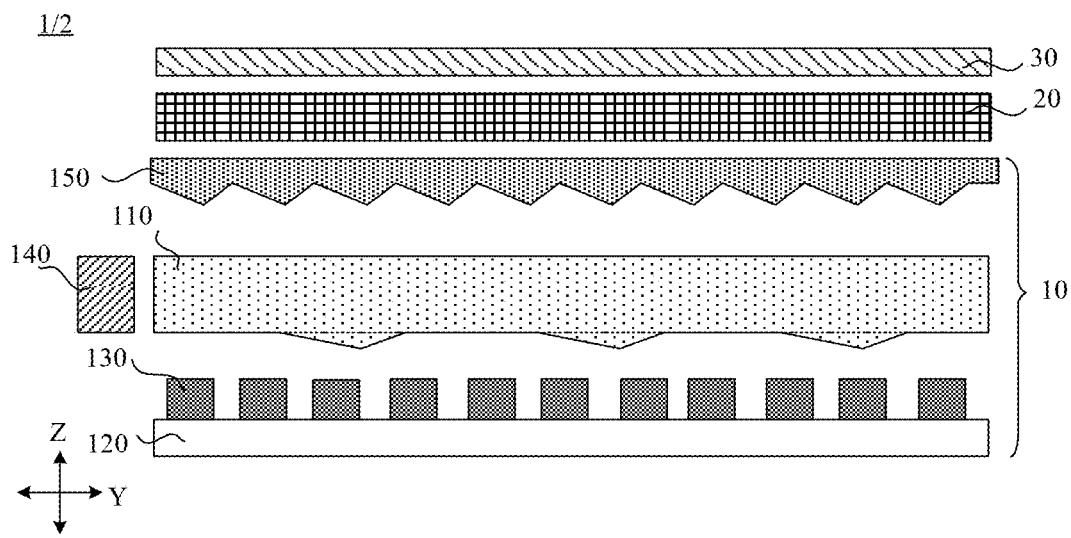
FIG. 24 is a structural diagram of yet another display apparatus or another anti-peep display apparatus, in accordance with some embodiments of the present disclosure.

In some embodiments, as shown in FIG. 24, the display apparatus 1 or the anti-peep display apparatus 2 further includes a liquid crystal dimming box 30 located on a side of the display panel 20 away from the backlight module 10.

For example, the liquid crystal dimming box 30 has a function of diverging or collimating light, and further coordinates with the operating states of the second light-emitting devices 140 to collimate the light, so as to improve the anti-peep effect.

For example, the liquid crystal dimming box 30 may include a polarizer, a second common electrode, second pixel electrode(s), liquid crystal molecules, and the like.

For example, the liquid crystal dimming box 30 may adjust the light exiting from the display panel 20. For example, in a case where the display apparatus 1 is in the display mode of the anti-peep state, the liquid crystal dimming box 30 may further collimate the light exiting from the display panel 20, so that the users may view the display image from a rather small viewing angle, thereby further improving the anti-peep effect of the display apparatus 1. As another example, in a case where the display apparatus 1 is in the display mode of the sharing state, the liquid crystal dimming box 30 may further make the light exiting from the display panel 20 diverged, so that the exit angle of the light further increases. Therefore, the users may view the display image from a rather large viewing angle, thereby further improving the display effect of the display apparatus 1 in the sharing state.

Figure 25:
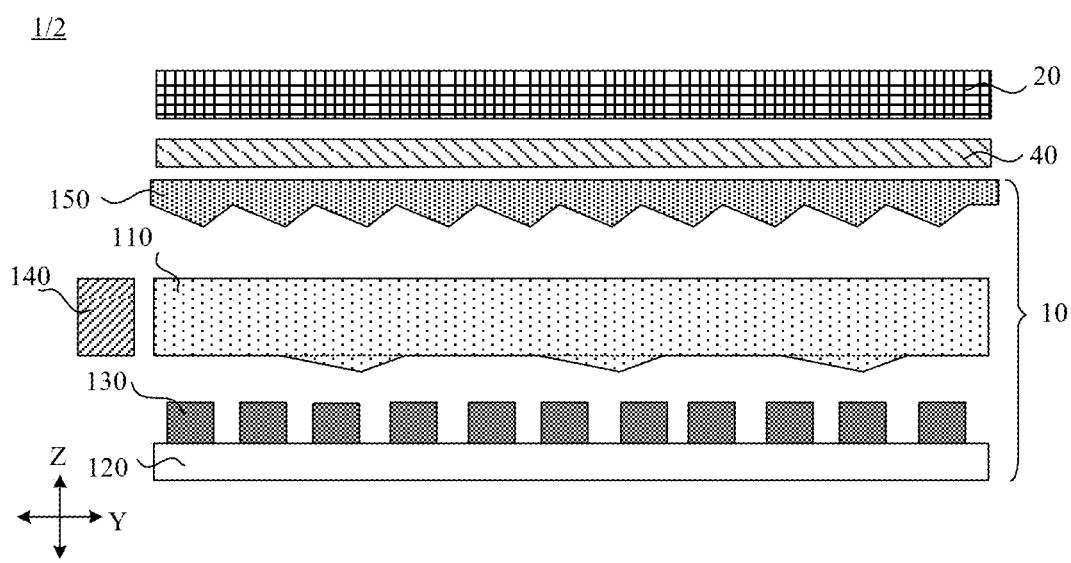
FIG. 25 is a structural diagram of yet another display apparatus or another anti-peep display apparatus, in accordance with some embodiments of the present disclosure.

In some other embodiments, as shown in FIG. 25, the display apparatus 1 or the anti-peep display apparatus 2 further includes an advance light control film (ALCF) 40 located between the display panel 20 and the backlight module 10.

For example, the advance light control film 40 may include light-transmitting regions and non-light-transmitting regions that are arranged at intervals.

For example, the advance light control film 40 may adjust the light emitted by the backlight module 10. For example, in a case where the display apparatus 1 is in the display mode of the anti-peep state, the advance light control film 40 may collimate light within a certain angle range emitted by the backlight module 10, so that the users may view the display image from a rather small viewing angle, thereby further improving the anti-peep effect of the display apparatus 1.

Figure 26:
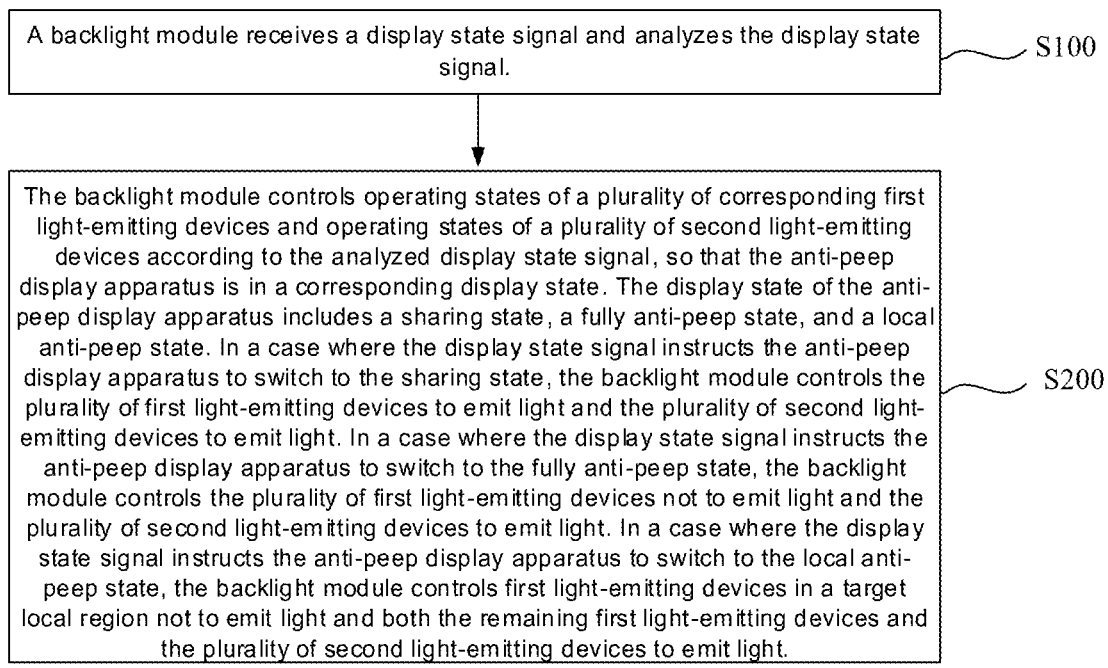
FIG. 26 is a flow diagram of a method for driving an anti-peep display apparatus, in accordance with some embodiments of the present disclosure.

Some embodiments of the present disclosure further provide a driving method for an anti-peep display apparatus. As shown in FIG. 26, the driving method includes the following steps.

In S100, the backlight module 10 receives a display state signal and analyzes the display state signal.

For example, after receiving the user's instruction of switching the display state, the display driver IC sends the display state signal to the backlight module 10.

In some examples, the display state signal may include a sharing state signal, a full anti-peep state signal, and a local anti-peep state signal.

For example, the backlight module 10 may include a processor, and the processor analyzes the display state signal. The analyzed display state signal includes location information and the like.

For example, in a case where the display state corresponding to the display state signal is the sharing state, the above position information is position information corresponding to all the first light-emitting devices 130 and all the second light-emitting devices 140 that provide backlight in the backlight module 10.

As another example, in a case where the display state corresponding to the display state signal is the fully anti-peep state, the above position information is position information corresponding to all the second light-emitting devices 140 that provide backlight in the backlight module 10.

As another example, in a case where the display state corresponding to the display state signal is the local anti-peep state, the above position information is position information of first light-emitting devices 130 in the backlight module 10 corresponding to a local anti-peep region and position information of all the second light-emitting devices 140.

In S200, the backlight module 10 controls operating states of the plurality of corresponding first light-emitting devices 130 and operating states of the plurality of second light-emitting devices 140 according to the analyzed display state signal, so that the anti-peep display apparatus 2 is in a corresponding display state.

In some examples, the display state of the anti-peep display apparatus 2 includes a sharing state, a fully anti-peep state, and a local anti-peep state.

In a case where the display state signal instructs the anti-peep display apparatus to switch to the sharing state, the backlight module 10 controls the plurality of first light-emitting devices 130 to emit light and controls the plurality of second light-emitting devices 140 to emit light. In a case where the display state signal instructs the anti-peep display apparatus to switch to the fully anti-peep state, the backlight module 10 controls the plurality of first light-emitting devices 130 not to emit light and controls the plurality of second light-emitting devices 140 to emit light. In a case where the display state signal instructs the anti-peep display apparatus to switch to the local anti-peep state, the backlight module 10 controls first light-emitting devices 130 in a target local region not to emit light and controls the remaining first light-emitting devices 130 and the plurality of second light-emitting devices 140 to emit light.

For example, the substrate 120 in the backlight module 10 may control, according to the display state signal containing the position information and in combination with chip(s) 121 or driving circuits(s) 125 of corresponding position, operating states of first light-emitting devices 130 and second light-emitting devices 140 at the corresponding position, so that the anti-peep display apparatus is in the corresponding display state.

For example, the user sends an instruction for switching the display state of the anti-peep display apparatus, and the display driver IC of the anti-peep display apparatus receives the instruction and processes the instruction to obtain the display state signal. The display driver IC transmits the display state signal to the backlight module 10. The processor of the backlight module 10 analyzes the received display state signal into corresponding position information and the like, and transmits the position information and the like to the substrate 120, so that the substrate 120 controls the operating states of the corresponding first light-emitting devices 130 and the operating states of the second light-emitting devices 140.

For example, in a case where the display state signal instructs the anti-peep display apparatus to switch to the local anti-peep state, and the local region is a central region of the anti-peep display apparatus, the backlight module controls first light-emitting devices 130 in the target local region corresponding to the central region not to emit light, and controls the remaining first light-emitting devices 130 and the plurality of second light-emitting devices 140 to emit light, so that the backlight module 10 only provides the backlight of the relatively small second viewing angle for the central region of the display panel 20, and the backlight module 10 provides the backlight of the relatively large second viewing angle and the backlight of the relatively small first viewing angle for the region of the display panel 20 except for the central region. As a result, the users may view the image display on the central region only from the relatively small second viewing angle, and view the image display on other regions other than the central region from both the relatively large and relatively small viewing angles.

The above driving method is adopted in some embodiments of the present disclosure, so that the anti-peep display apparatus may realize the dynamic local anti-peep function, and may switch between the sharing state, the full anti-peep state and the local anti-peep state, thereby realize a variety of functions of the anti-peep display apparatus.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A backlight module, comprising:
    a light guide plate having a bottom surface and a light exit surface that are disposed oppositely, and a light incident surface connecting the bottom surface and the light exit surface;
    a substrate located on a side of the bottom surface away from the light exit surface;
    a plurality of first light-emitting devices located on a side of the substrate proximate to the bottom surface; the substrate being configured to control operating states of the plurality of first light-emitting devices;
    a plurality of second light-emitting devices disposed opposite to the light incident surface; and
    a prism sheet located on a side of the light guide plate away from the substrate; wherein
    the plurality of first light-emitting devices are configured to emit first light, so that the first light passes through the light guide plate and the prism sheet to become light of a first viewing angle; and
    the prism sheet is configured to cooperate with the light guide plate to modulate second light emitted by the plurality of second light-emitting devices into light of a second viewing angle, and the first viewing angle is larger than the second viewing angle; and
    the substrate includes a plurality of driving circuits; and a driving circuit is electrically connected to at least one first light-emitting device; the substrate further includes a plurality of scan signal lines, a plurality of data signal lines and a plurality of second voltage lines;
    the driving circuit includes a first transistor, a second transistor and a storage capacitor; wherein a control electrode of the first transistor is electrically connected to a scan signal line, a first electrode of the first transistor is electrically connected to a data signal line, and a second electrode of the first transistor is electrically connected to a first electrode of the storage capacitor; a control electrode of the second transistor is electrically connected to the first electrode of the storage capacitor, a first electrode of the second transistor is electrically connected to a first electrode of a first light-emitting device, and a second electrode of the second transistor is grounded; a second electrode of the first light-emitting device is electrically connected to a second voltage line; and a second electrode of the storage capacitor is grounded.

2. A backlight module, comprising:
a light guide plate having a bottom surface and a light exit surface that are disposed oppositely, and a light incident surface connecting the bottom surface and the light exit surface;
a substrate located on a side of the bottom surface away from the light exit surface;
a plurality of first light-emitting devices located on a side of the substrate proximate to the bottom surface; the substrate being configured to control operating states of the plurality of first light-emitting devices;
a plurality of second light-emitting devices disposed opposite to the light incident surface; and
a prism sheet located on a side of the light guide plate away from the substrate; wherein
the plurality of first light-emitting devices are configured to emit first light, so that the first light passes through the light guide plate and the prism sheet to become light of a first viewing angle; and
the prism sheet is configured to cooperate with the light guide plate to modulate second light emitted by the plurality of second light-emitting devices into light of a second viewing angle, and the first viewing angle is larger than the second viewing angle;
wherein the substrate includes a plurality of chips, and a chip of the plurality of chips is electrically connected to at least one first light-emitting device;
the substrate further includes a plurality of first pad groups each electrically connected to a first light-emitting device and a plurality of second pad groups each electrically connected to the chip;
each first pad group includes at least two adjacent pads, and each second pad group includes at least four adjacent pads; and
a pad of the second pad group is electrically connected to a pad of at least one first pad group.

3. The backlight module according to claim 1, wherein the substrate further includes a plurality of first voltage lines and a plurality of first connection lines; a first voltage line is electrically connected to a pad of at least one first pad group; and a first connection line is electrically connected to the pad of the second pad group and a pad of a first pad group; and/or
in a case where the chip is electrically connected to multiple first light-emitting devices, the substrate further includes a plurality of second connection lines; and a second connection line is electrically connected to pads of two adjacent first pad groups; and/or
the substrate further includes a plurality of address signal lines, a plurality of power supply voltage signal lines and a plurality of common voltage signal lines; and multiple pads of the second pad group are electrically connected to a common voltage signal line, a power supply voltage signal line and an address signal line, respectively.

4. The backlight module according to claim 2, wherein the first light-emitting device has a top surface and a first side surface surrounding the top surface and connected to the top surface, wherein
a light intensity of light emitted from the top surface of the first light-emitting device is smaller than a light intensity of light emitted from the first side surface of the first light-emitting device.

5. The backlight module according to claim 4, wherein the first light-emitting device includes:
a first lamp bead; and
a transflective film covering a top surface of the first lamp bead; or the first light-emitting device includes:
a second lamp bead; and
a lens, wherein the lens covers a top surface of the second lamp bead; a surface of the lens away from the substrate is a smooth curved surface, and the smooth curved surface includes a first portion and a second portion surrounding the first portion; the first portion is concave toward a direction approaching the substrate, and the second portion is convex toward a direction away from the substrate.

6. The backlight module according to claim 2, wherein the light guide plate further has a second side surface; the second side surface connects the bottom surface and the light exit surface, and is opposite to the light incident surface;
an included angle between the bottom surface and the second side surface is an obtuse angle, and an included angle between the bottom surface and the light exit surface is a first acute angle.

7. The backlight module according to claim 2, wherein the light guide plate includes a light guide body and a plurality of microstructures located on a side of the light guide body proximate to the substrate; and
the plurality of microstructures are configured to increase exit angle of the second light, so that the exit angle of the second light reaches a preset exit angle range.

8. The backlight module according to claim 7, wherein the microstructures each have a reflective surface, and the reflective surface is configured to reflect the second light incident on the reflective surface.

9. The backlight module according to claim 8, wherein the microstructures each further have a third side surface connected to the reflective surface;
an included angle between the third side surface and the light exit surface is a second acute angle, an included angle between the reflective surface and the light exit surface is a third acute angle, and the second acute angle is greater than the third acute angle; an included angle between the third side surface and the reflective surface is an obtuse angle; and the reflective surface is closer to the plurality of second light-emitting devices than the third side surface.

10. The backlight module according to claim 8, wherein the plurality of microstructures are arranged in an array; a sum of areas of reflective surfaces of multiple microstructures in a column is positively correlated with a distance between the multiple microstructures in the column and the plurality of second light-emitting devices; or
a sum of areas of reflective surfaces of multiple microstructures in the plurality of microstructures is positively correlated with a distance between the multiple microstructures and the plurality of second light-emitting devices, and an area of a reflective surface of a microstructure is positively correlated with a distance between the microstructure and the plurality of second light- emitting devices.

11. The backlight module according to claim 8, wherein an arrangement density of multiple microstructures in the plurality of microstructures is positively correlated with a distance between the multiple microstructures and the plurality of second light- emitting devices.

12. The backlight module according to claim 9, wherein the reflective surface and the third side surface of each of the plurality of microstructures are convex toward a direction away from the light exit surface; or the reflective surface and the third side surface of each of the plurality of microstructures are concave toward a direction approaching the light exit surface.

13. The backlight module according to claim 2, wherein the prism sheet includes a plurality of protrusions; the plurality of protrusions are located on a side of the prism sheet proximate to the light guide plate, and the plurality of protrusions are configured to make light passing through the plurality of protrusions converge.

14. The backlight module according to claim 13, wherein a protrusion of the plurality of protrusions includes a fourth side surface and a fifth side surface connected to the fourth side surface; the fourth side surface is closer to the plurality of second light-emitting devices than the fifth side surface; and an included angle between the fourth side surface and the fifth side surface is a fourth acute angle.

15. The backlight module according to claim 13, wherein the plurality of protrusions extend in a first direction;
in a thickness direction of the substrate and in a second direction, a cross-sectional shape of a protrusion of the plurality of protrusions is a triangle; the first direction is parallel to an arrangement direction of the plurality of second light-emitting devices, and the first direction is perpendicular to the second direction.

16. A display apparatus, comprising the backlight module according to claim 1, and a display panel located on a light-exit side of the backlight module.

17. An anti-peep display apparatus, comprising the backlight module according to claim 1, and a display panel located on a light-exit side of the backlight module.

18. A driving method for the anti-peep display apparatus according to claim 17, comprising:
the backlight module receiving a display state signal and analyzing the display state signal; and
the backlight module controlling the operating states of the plurality of corresponding first light-emitting devices and operating states of the plurality of second light-emitting devices according to the analyzed display state signal, so as to make the anti-peep display apparatus in a corresponding display state; wherein
a display state of the anti-peep display apparatus includes a sharing state, a fully anti-peep state and a local anti-peep state;
in a case where the display state signal instructs the anti-peep display apparatus to switch to the sharing state, the backlight module controls the plurality of first light-emitting devices to emit light and controls the plurality of second light-emitting devices to emit light; in a case where the display state signal instructs the anti-peep display apparatus to switch to the fully anti-peep state, the backlight module controls the plurality of first light-emitting devices not to emit light and controls the plurality of second light-emitting devices to emit light; and in a case where the display state signal instructs the anti-peep display apparatus to switch to the local anti-peep state, the backlight module controls first light-emitting devices in a target local region not to emit light and controls both remaining first light-emitting devices and the plurality of second light-emitting devices to emit light.

* * * * *